US012418380B2

(12) United States Patent
Malladi et al.

(10) Patent No.: US 12,418,380 B2
(45) Date of Patent: Sep. 16, 2025

(54) REFERENCE SIGNAL PATTERNS BASED ON RELATIVE SPEED BETWEEN A TRANSMITTER AND RECEIVER

(71) Applicant: QUALCOMM Incorporated, San Diego, CA (US)

(72) Inventors: Durga Prasad Malladi, San Diego, CA (US); Shuanshuan Wu, San Diego, CA (US); Sudhir Kumar Baghel, Pleasanton, CA (US); Kapil Gulati, Belle Mead, NJ (US); Shailesh Patil, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 229 days.

(21) Appl. No.: 18/074,299

(22) Filed: Dec. 2, 2022

(65) Prior Publication Data

US 2023/0094951 A1   Mar. 30, 2023

Related U.S. Application Data

(62) Division of application No. 16/843,797, filed on Apr. 8, 2020, now Pat. No. 11,522,661.
(Continued)

(51) Int. Cl.
*H04L 5/00* (2006.01)
*H04W 4/40* (2018.01)
(Continued)

(52) U.S. Cl.
CPC .......... *H04L 5/0051* (2013.01); *H04L 5/0007* (2013.01); *H04L 5/0069* (2013.01);
(Continued)

(58) Field of Classification Search
CPC ..... H04L 5/003; H04L 5/0007; H04L 5/0048; H04L 5/005; H04L 5/0051; H04L 5/0056;
(Continued)

(56) References Cited

U.S. PATENT DOCUMENTS 10,756,869 B2 * 8/2020 Khoryaev ............. H04W 76/14
10,904,725 B2 * 1/2021 Nguyen ............. H04L 41/0816
(Continued)

OTHER PUBLICATIONS

Catt: "Discussion on Physical Layer Structure in NR V2X," 3GPP Draft, 3GPP TSG RAN WG1 Meeting #96bis, R1-1905351, 3rd Generation Partnership Project (3GPP), Mobile Competence Centre, 650, Route Des Lucioles, F-06921, Sophia-Antipolis Cedex, France, vol. RAN WG1, No. Xi'an, China, Apr. 8, 2019-Apr. 12, 2019, Apr. 3, 2019 (Apr. 3, 2019), XP051707425, 13 Pages, the Whole Document, Title Section 4.2. PSSCH DMRS Design.
(Continued)

*Primary Examiner* — James M Perez
(74) *Attorney, Agent, or Firm* — Holland & Hart LLP/QUALCOMM Incorporated

(57) ABSTRACT

Methods, systems, and devices for wireless communications (e.g., vehicle to everything systems) are described relating to an adaptive design of demodulation reference signals (DMRS) density based on user equipment (UE) velocity. A UE may send assistance information to a transmitting UE to help identify a DMRS pattern based on the relative speed between the two UEs. Also, the transmitter may determine the adaptive DMRS pattern based on its speed without information of the receiver's speed. The transmitter may indicate the adaptive DMRS pattern in control information to the receiver. A base station may receive assistance information, and the base station may determine the adaptive DMRS pattern to be used by the transmitting UE based on the received assistance information and then indicate the adaptive DMRS pattern to the transmitting UE. A UE may
(Continued)

determine an adaptive DMRS pattern to use based on feedback from the receiving UE.

25 Claims, 18 Drawing Sheets

Related U.S. Application Data

(60) Provisional application No. 62/833,635, filed on Apr. 12, 2019.

(51) Int. Cl.
*H04W 64/00* (2009.01)
*H04W 92/18* (2009.01)

(52) U.S. Cl.
CPC ........... *H04W 4/40* (2018.02); *H04W 64/006* (2013.01); *H04W 92/18* (2013.01)

(58) Field of Classification Search
CPC ... H04L 5/0067; H04L 5/0068; H04L 5/0069; H04W 4/30; H04W 4/40; H04W 36/24; H04W 36/32; H04W 64/00; H04W 64/006; H04W 92/00; H04W 92/16; H04W 92/18

See application file for complete search history.

(56) References Cited

U.S. PATENT DOCUMENTS

| | | | | |
|---|---|---|---|---|
| 11,108,530 | B2* | 8/2021 | Bharadwaj | H04L 27/2607 |
| 11,212,053 | B2* | 12/2021 | Manolakos | H04L 5/0012 |
| 11,224,077 | B2* | 1/2022 | Lei | H04W 52/146 |
| 11,283,567 | B2* | 3/2022 | Lee | H04L 5/0048 |
| 11,375,350 | B2* | 6/2022 | Basu Mallick | H04W 4/023 |
| 11,483,112 | B2* | 10/2022 | Levitsky | H04W 72/0446 |
| 11,522,661 | B2* | 12/2022 | Malladi | H04L 5/0053 |
| 11,528,110 | B2* | 12/2022 | Manolakos | H04L 5/0051 |
| 11,552,770 | B2* | 1/2023 | Bharadwaj | H04L 5/0048 |
| 11,638,309 | B2* | 4/2023 | Lei | H04W 52/282 370/329 |
| 11,695,499 | B2* | 7/2023 | Levitsky | H04W 72/23 370/329 |
| 11,784,747 | B2* | 10/2023 | Levitsky | H04L 5/0035 370/329 |
| 11,936,581 | B2* | 3/2024 | Levitsky | H04W 72/0446 |
| 11,943,174 | B2* | 3/2024 | Levitsky | H04L 5/0048 |
| 11,968,136 | B2* | 4/2024 | Wu | H04L 5/0094 |
| 12,069,549 | B2* | 8/2024 | Basu Mallick | H04W 4/029 |
| 12,120,748 | B2* | 10/2024 | Cao | H04L 5/0048 |
| 12,212,445 | B2* | 1/2025 | Patchava | H04L 27/2605 |
| 2014/0286255 | A1* | 9/2014 | Nam | H04L 27/2636 370/329 |
| 2015/0230263 | A1* | 8/2015 | Roy | H04W 36/00837 455/452.2 |
| 2017/0188391 | A1* | 6/2017 | Rajagopal | H04W 74/0816 |
| 2017/0273128 | A1* | 9/2017 | Abedini | H04W 76/14 |
| 2018/0199299 | A1* | 7/2018 | Wakabayashi | H04W 56/002 |
| 2018/0212733 | A1* | 7/2018 | Khoryaev | H04L 5/0007 |
| 2018/0241508 | A1* | 8/2018 | Chervyakov | H04L 27/2675 |
| 2018/0254868 | A1* | 9/2018 | Saito | H04L 5/0048 |
| 2018/0294935 | A1* | 10/2018 | Uchiyama | H04W 72/20 |
| 2019/0208482 | A1* | 7/2019 | Tooher | H04L 5/0094 |
| 2019/0222381 | A1* | 7/2019 | Zhang | H04L 27/26025 |
| 2019/0222385 | A1* | 7/2019 | Hessler | H04L 27/2655 |
| 2019/0222985 | A1* | 7/2019 | Nguyen | H04L 5/0048 |
| 2019/0229964 | A1* | 7/2019 | Ouchi | H04L 5/0051 |
| 2020/0059895 | A1* | 2/2020 | Atungsiri | H04L 5/0048 |
| 2020/0092685 | A1* | 3/2020 | Fehrenbach | H04W 36/08 |
| 2020/0106590 | A1* | 4/2020 | Bharadwaj | H04L 27/2602 |
| 2020/0146000 | A1* | 5/2020 | Shin | H04L 27/2613 |
| 2020/0266857 | A1* | 8/2020 | Hwang | H04L 1/1864 |
| 2020/0313818 | A1* | 10/2020 | Wu | H04L 5/0094 |
| 2020/0314804 | A1* | 10/2020 | Shin | H04L 5/0055 |
| 2020/0314916 | A1* | 10/2020 | Park | H04W 72/04 |
| 2020/0314939 | A1* | 10/2020 | Park | H04W 72/12 |
| 2020/0322095 | A1* | 10/2020 | Park | H04W 4/40 |
| 2020/0328861 | A1* | 10/2020 | Malladi | H04L 5/0069 |
| 2020/0329503 | A1* | 10/2020 | Da Silva | H04W 72/54 |
| 2020/0336872 | A1* | 10/2020 | Basu Mallick | H04W 4/029 |
| 2021/0006376 | A1* | 1/2021 | Cirik | H04L 1/1861 |
| 2021/0058207 | A1* | 2/2021 | Lee | H04L 5/0048 |
| 2021/0067290 | A1* | 3/2021 | Chen | H04L 5/0033 |
| 2021/0099224 | A1* | 4/2021 | Yeo | H04B 7/088 |
| 2021/0105118 | A1* | 4/2021 | Wu | H04L 5/0033 |
| 2021/0127376 | A1* | 4/2021 | Zeng | H04W 72/20 |
| 2021/0266868 | A1* | 8/2021 | Shin | H04W 72/02 |
| 2021/0359806 | A1* | 11/2021 | Levitsky | H04L 5/0048 |
| 2021/0367732 | A1* | 11/2021 | Salim | H04L 5/0044 |
| 2021/0385766 | A1* | 12/2021 | Manolakos | H04W 52/0274 |
| 2022/0046483 | A1* | 2/2022 | Chen | H04L 5/0051 |
| 2022/0061041 | A1* | 2/2022 | Chen | H04W 72/20 |
| 2022/0140964 | A1* | 5/2022 | Chen | H04W 4/40 370/330 |
| 2022/0200755 | A1* | 6/2022 | Lee | H04L 5/0048 |
| 2022/0225292 | A1* | 7/2022 | Mohammad Soleymani | H04W 72/02 |
| 2022/0232527 | A1* | 7/2022 | Hong | H04L 1/08 |
| 2022/0240321 | A1* | 7/2022 | Cao | H04L 5/0051 |
| 2022/0329992 | A1* | 10/2022 | Basu Mallick | H04W 4/40 |
| 2023/0032326 | A1* | 2/2023 | Levitsky | H04L 5/0048 |
| 2023/0094951 | A1* | 3/2023 | Malladi | H04L 5/0007 375/260 |
| 2023/0284084 | A1* | 9/2023 | Chae | H04L 5/0051 370/230 |
| 2024/0015057 | A1* | 1/2024 | Patchava | H04L 5/0094 |
| 2024/0137881 | A1* | 4/2024 | Yoon | H04L 5/00 |
| 2024/0155577 | A1* | 5/2024 | Li | H04L 5/0051 |
| 2025/0047451 | A1* | 2/2025 | Xiong | H04L 5/0051 |

OTHER PUBLICATIONS

Huawei, et al., "Discussion on Reference Signal Design for Sidelink Control and Data Channel," 3GPP Draft, 3GPP TSG RAN WG1 Ad-Hoc Meeting 1901, R1-1900024 3rd Generation Partnership Project (3GPP), Mobile Competence Centre, 650, Route Des Lucioles, F-06921, Sophia-Antipolis Cedex, France, vol. RAN WG1, No. Taipei; Jan. 21, 2019-Jan. 25, 2019, Jan. 20, 2019 (Jan. 20, 2019), XP051592950, 7 pages, the whole document.
International Preliminary Report on Patentability—PCT/US2020/027496, The International Bureau of WIPO—Geneva, Switzerland, Oct. 21, 2021.
International Search Report and Written Opinion—PCT/US2020/027496—ISA/EPO—Jul. 20, 2020.
Mitsubishi Electric: "Views on Physical Layer Design for NR V2X Sidelink," 3GPP Draft, 3GPP TSG RAN WG1 #96b, R1-1905123-RAN1#96B-V2X_RS_MITSUBISHI, 3rd Generation Partnership Project (3GPP), Mobile Competence Centre, 650, Route Des Lucioles, F-06921, Sophia-Antipolis Cedex, France, vol. RAN WG1. No. Xi'an. China; Apr. 8, 2019-Apr. 12, 2019, Apr. 2, 2019 (Apr. 2, 2019). XP051707393, 17 pages, the whole document.

* cited by examiner

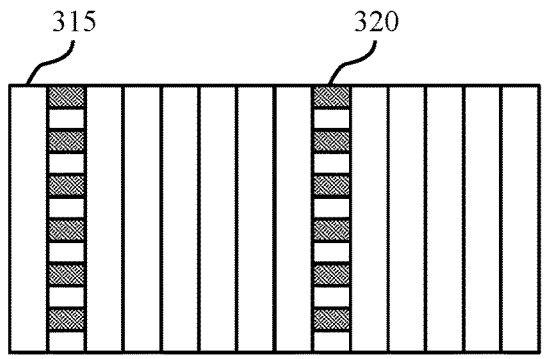
FIG. 3A
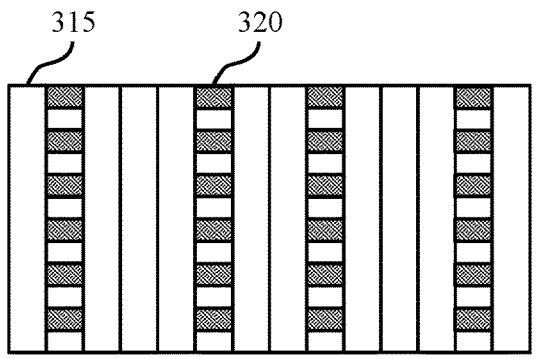
FIG. 3B
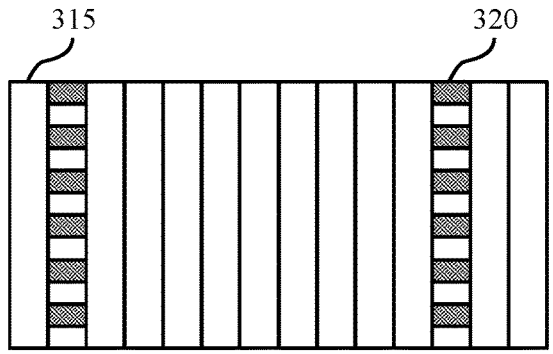
FIG. 3C
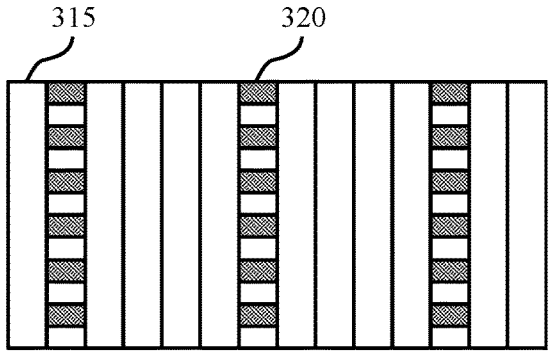
FIG. 3D
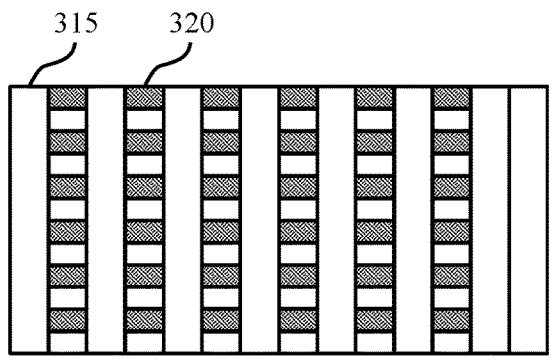
FIG. 3E
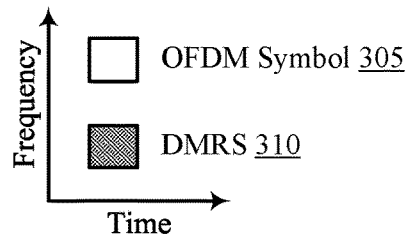

REFERENCE SIGNAL PATTERNS BASED ON RELATIVE SPEED BETWEEN A TRANSMITTER AND RECEIVER

CROSS REFERENCE

The present Application for Patent is a Divisional of U.S. patent application Ser. No. 16/843,797 by MALLADI et al., entitled "REFERENCE SIGNAL PATTERNS BASED ON RELATIVE SPEED BETWEEN A TRANSMITTER AND RECEIVER" filed Apr. 8, 2020, which claims the benefit of U.S. Provisional Patent Application No. 62/833,635 by MALLADI et al., entitled "REFERENCE SIGNAL PATTERNS BASED ON RELATIVE SPEED BETWEEN A TRANSMITTER AND RECEIVER," filed Apr. 12, 2019, each of which are assigned to the assignee hereof, and each of which are expressly incorporated by reference in its entirety herein.

INTRODUCTION

The following relates generally to wireless communications, and more specifically to reference signal patterns.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

SUMMARY

A method of wireless communications at a first wireless device is described. The method may include transmitting assistance information to a second wireless device and determining an adaptive reference signal pattern of a reference signal for demodulating data, the adaptive reference signal pattern based on the assistance information.

An apparatus for wireless communications at a first wireless device is described. The apparatus may include a processor and memory coupled to the processor. The processor and memory may be configured to cause the apparatus to transmit assistance information to a second wireless device and determine an adaptive reference signal pattern of a reference signal for demodulating data, the adaptive reference signal pattern based on the assistance information.

Another apparatus for wireless communications at a first wireless device is described. The apparatus may include means for transmitting assistance information to a second wireless device and determining an adaptive reference signal pattern of a reference signal for demodulating data, the adaptive reference signal pattern based on the assistance information.

A non-transitory computer-readable medium storing code for wireless communications at a first wireless device is described. The code may include instructions executable by a processor to transmit assistance information to a second wireless device and determine an adaptive reference signal pattern of a reference signal for demodulating data, the adaptive reference signal pattern based on the assistance information.

A method of wireless communications at a first wireless device is described. The method may include transmitting assistance information to a second wireless device, the assistance information associated with a speed of the first wireless device, or a location of the first wireless device, or a combination thereof, and identifying a reference signal pattern of a reference signal for demodulating data, the reference signal pattern based on the assistance information.

An apparatus for wireless communications at a first wireless device is described. The apparatus may include a processor and memory coupled to the processor. The processor and memory may be configured to cause the apparatus to transmit assistance information to a second wireless device, the assistance information associated with a speed of the first wireless device, or a location of the first wireless device, or a combination thereof, and identify a reference signal pattern of a reference signal for demodulating data, the reference signal pattern based on the assistance information.

Another apparatus for wireless communications at a first wireless device is described. The apparatus may include means for transmitting assistance information to a second wireless device, the assistance information associated with a speed of the first wireless device, or a location of the first wireless device, or a combination thereof, and identifying a reference signal pattern of a reference signal for demodulating data, the reference signal pattern based on the assistance information.

A non-transitory computer-readable medium storing code for wireless communications at a first wireless device is described. The code may include instructions executable by a processor to transmit assistance information to a second wireless device, the assistance information associated with a speed of the first wireless device, or a location of the first wireless device, or a combination thereof, and identify a reference signal pattern of a reference signal for demodulating data, the reference signal pattern based on the assistance information.

Some examples of the method, apparatuses, and non-transitory computer-readable medium described herein may further include operations, features, means, or instructions for determining a speed of the first wireless device, and transmitting, as part of the assistance information, a speed value indicating the speed of the first wireless device.

Some examples of the method, apparatuses, and non-transitory computer-readable medium described herein may further include operations, features, means, or instructions for determining a movement direction of the first wireless device, and transmitting, as part of the assistance information, a direction value indicating the movement direction of the first wireless device.

Some examples of the method, apparatuses, and non-transitory computer-readable medium described herein may further include operations, features, means, or instructions for determining an absolute movement direction of the first wireless device, and identifying the direction value from a direction index based on the absolute movement direction, the direction index including a map between one or more absolute movement directions and respective direction values.

In some examples of the method, apparatuses, and non-transitory computer-readable medium described herein, each of the respective direction values may be based on an angular offset from a cardinal direction or an intercardinal direction. Some examples of the method, apparatuses, and non-transitory computer-readable medium described herein may further include operations, features, means, or instructions for determining an absolute speed of the first wireless device, and identifying the speed value from a speed index based on the absolute speed, the speed index including a map between respective speed values and one or more absolute speeds, or a range of absolute speeds, or a combination thereof. In some examples of the method, apparatuses, and non-transitory computer-readable medium described herein, the speed index may be from a set of speed indices.

Some examples of the method, apparatuses, and non-transitory computer-readable medium described herein may further include operations, features, means, or instructions for identifying a configuration of the speed index, where identifying the speed value may be based on the configuration. Some examples of the method, apparatuses, and non-transitory computer-readable medium described herein may further include operations, features, means, or instructions for receiving an indication of the configuration of the speed index.

Some examples of the method, apparatuses, and non-transitory computer-readable medium described herein may further include operations, features, means, or instructions for determining a location of the first wireless device, and transmitting, as part of the assistance information, a location value indicating the location of the first wireless device.

Some examples of the method, apparatuses, and non-transitory computer-readable medium described herein may further include operations, features, means, or instructions for identifying a zone identifier from a set of zone identifiers based on the location of the first wireless device, each of the set of zone identifiers being associated with a respective geographic area, where the location value includes the zone identifier.

Some examples of the method, apparatuses, and non-transitory computer-readable medium described herein may further include operations, features, means, or instructions for identifying a relative speed between the first wireless device and the second wireless device based on the assistance information, where the adaptive reference signal pattern may be determined based on the relative speed.

In some examples of the method, apparatuses, and non-transitory computer-readable medium described herein, identifying the relative speed may include operations, features, means, or instructions for receiving, from the second wireless device, an indication of a speed of the second wireless device, or a velocity of the second wireless device, or a location of the second wireless device, or a combination thereof, and determining the relative speed based on the received indication.

In some examples of the method, apparatuses, and non-transitory computer-readable medium described herein, determining the relative speed may include operations, features, means, or instructions for determining the speed of the first wireless device, and calculating the relative speed based on the speed of the first wireless device and the speed of the second wireless device.

In some examples of the method, apparatuses, and non-transitory computer-readable medium described herein, determining the relative speed may include operations, features, means, or instructions for determining a velocity of the first wireless device, and calculating the relative speed based on the velocity of the first wireless device and the velocity of the second wireless device.

In some examples of the method, apparatuses, and non-transitory computer-readable medium described herein, determining the relative speed may include operations, features, means, or instructions for determining, based on the location of the second wireless device, one or more zones the second wireless device was located in during a time period, where the received indication includes one or more zone identifiers corresponding to respective zones, calculating the speed of the second wireless device based on the one or more zones the second wireless device was located in during the time period, and calculating the relative speed based on the speed of the first wireless device and the speed of the second wireless device.

Some examples of the method, apparatuses, and non-transitory computer-readable medium described herein may further include operations, features, means, or instructions for transmitting, as part of the assistance information, an indication of the relative speed. Some examples of the method, apparatuses, and non-transitory computer-readable medium described herein may further include operations, features, means, or instructions for determining the adaptive reference signal pattern based on the relative speed, and transmitting, as part of the assistance information, an indication of the adaptive reference signal pattern.

In some examples of the method, apparatuses, and non-transitory computer-readable medium described herein, determining the adaptive reference signal pattern may include operations, features, means, or instructions for receiving, from the second wireless device, an indication of the adaptive reference signal pattern, and determining the adaptive reference signal pattern based on the indication.

In some examples of the method, apparatuses, and non-transitory computer-readable medium described herein, determining the adaptive reference signal pattern may include operations, features, means, or instructions for receiving, from a set of wireless devices, respective indications of one or more reference signal patterns, and determining the adaptive reference signal pattern based on the one or more reference signal patterns.

In some examples of the method, apparatuses, and non-transitory computer-readable medium described herein, determining the adaptive reference signal pattern may include operations, features, means, or instructions for selecting the adaptive reference signal pattern from one or more reference signal patterns, each of the one or more reference signal patterns corresponding to a respective relative speed, or a range of relative speeds, or a combination thereof.

Some examples of the method, apparatuses, and non-transitory computer-readable medium described herein may further include operations, features, means, or instructions for identifying a configuration of a map between the each of the one or more reference signal patterns and the respective relative speed, or the range of relative speeds, or a combination thereof.

In some examples of the method, apparatuses, and non-transitory computer-readable medium described herein, determining the adaptive reference signal pattern may include operations, features, means, or instructions for identifying a set of communication links with other wireless devices, each communication link of the set of communication links being associated with a relative speed between the first wireless device and a respective wireless device, and determining the adaptive reference signal pattern based on the relative speeds of the set of communication links.

Some examples of the method, apparatuses, and non-transitory computer-readable medium described herein may further include operations, features, means, or instructions for identifying a highest relative speed from the relative speeds of the set of communication links, where the adaptive reference signal pattern may be based on the highest relative speed.

Some examples of the method, apparatuses, and non-transitory computer-readable medium described herein may further include operations, features, means, or instructions for determining an error rate threshold for transmitting the data over the set of communication links, where the adaptive reference signal pattern may be based on the relative speeds of the set of communication links and the error rate threshold.

In some examples of the method, apparatuses, and non-transitory computer-readable medium described herein, determining the adaptive reference signal pattern may include operations, features, means, or instructions for identifying a subcarrier spacing for communicating with the second wireless device, and determining the adaptive reference signal pattern based on the subcarrier spacing and a relative speed between the first wireless device and the second wireless device.

In some examples of the method, apparatuses, and non-transitory computer-readable medium described herein, the adaptive reference signal pattern may be based on a map between the one or more reference signal patterns and a respective relative speed, or a range of relative speeds, or a combination thereof, and where the adaptive reference signal pattern may be determined based on the map and the subcarrier spacing.

Some examples of the method, apparatuses, and non-transitory computer-readable medium described herein may further include operations, features, means, or instructions for receiving first assistance information and second assistance information from the second wireless device, each of the first assistance information and the second assistance information being associated with a respective speed of the second wireless device, or a respective location of the second wireless device, or a combination thereof, and storing the first assistance information and the second assistance information at the first wireless device.

Some examples of the method, apparatuses, and non-transitory computer-readable medium described herein may further include operations, features, means, or instructions for identifying a difference between the first assistance information and the second assistance information, and determining the adaptive reference signal pattern based on the difference. Some examples of the method, apparatuses, and non-transitory computer-readable medium described herein may further include operations, features, means, or instructions for identifying a periodicity for transmitting the assistance information, where the assistance information may be transmitted in accordance with the periodicity.

Some examples of the method, apparatuses, and non-transitory computer-readable medium described herein may further include operations, features, means, or instructions for generating first assistance information and second assistance information for the first wireless device, each of the first assistance information and the second assistance information being associated with a respective speed of the first wireless device, or a respective location of the first wireless device, or a combination thereof, identifying a difference between the first assistance information and the second assistance information, and transmitting the assistance information based on identifying the difference.

Some examples of the method, apparatuses, and non-transitory computer-readable medium described herein may further include operations, features, means, or instructions for receiving a request to transmit the assistance information, where the assistance information may be transmitted in response to the received request.

Some examples of the method, apparatuses, and non-transitory computer-readable medium described herein may further include operations, features, means, or instructions for transmitting the data and the reference signal to the second wireless device, the reference signal being transmitted in accordance with the adaptive reference signal pattern. Some examples of the method, apparatuses, and non-transitory computer-readable medium described herein may further include operations, features, means, or instructions for receiving the data and the reference signal from the second wireless device, the reference signal being received in accordance with the adaptive reference signal pattern.

In some examples of the method, apparatuses, and non-transitory computer-readable medium described herein, transmitting the assistance information may include operations, features, means, or instructions for transmitting the assistance information as part of sidelink control information, or as part of a medium access control (MAC) control element, or over a sidelink data channel, or over a sidelink shared channel, or over a feedback channel, or a combination thereof.

In some examples of the method, apparatuses, and non-transitory computer-readable medium described herein, the adaptive reference signal pattern indicates one or more symbol periods during which the reference signal may be transmitted and a gap between each of the one or more symbol periods.

In some examples of the method, apparatuses, and non-transitory computer-readable medium described herein, the adaptive reference signal pattern may be from a set of reference signal patterns, each reference signal pattern of the set including a different number of symbol periods within a slot that include the reference signal.

In some examples of the method, apparatuses, and non-transitory computer-readable medium described herein, the adaptive reference signal pattern may be from a set of reference signal patterns, each reference signal pattern of the set including a different gap between symbol periods within a slot that include the reference signal.

Some examples of the method, apparatuses, and non-transitory computer-readable medium described herein may further include operations, features, means, or instructions for communicating with the second wireless device using sidelink communications, where the first wireless device includes a first UE and the second wireless device includes a second UE. In some examples of the method, apparatuses, and non-transitory computer-readable medium described herein, the sidelink communications may be vehicle to everything communications.

A method of wireless communications at a first wireless device is described. The method may include determining a speed of the first wireless device, identifying a subcarrier spacing for communicating with one or more other wireless devices, determining, based on the speed of the first wireless device and the subcarrier spacing, a reference signal pattern of a reference signal for demodulating data, and transmitting the data and the reference signal to the one or more other wireless devices, the reference signal being transmitted in accordance with the reference signal pattern.

An apparatus for wireless communications at a first wireless device is described. The apparatus may include a processor and memory coupled to the processor. The processor and memory may be configured to cause the apparatus to determine a speed of the first wireless device, identify a subcarrier spacing for communicating with one or more other wireless devices, determine, based on the speed of the first wireless device and the subcarrier spacing, a reference signal pattern of a reference signal for demodulating data, and transmit the data and the reference signal to the one or more other wireless devices, the reference signal being transmitted in accordance with the reference signal pattern.

Another apparatus for wireless communications at a first wireless device is described. The apparatus may include means for determining a speed of the first wireless device, identifying a subcarrier spacing for communicating with one or more other wireless devices, determining, based on the speed of the first wireless device and the subcarrier spacing, a reference signal pattern of a reference signal for demodulating data, and transmitting the data and the reference signal to the one or more other wireless devices, the reference signal being transmitted in accordance with the reference signal pattern.

A non-transitory computer-readable medium storing code for wireless communications at a first wireless device is described. The code may include instructions executable by a processor to determine a speed of the first wireless device, identify a subcarrier spacing for communicating with one or more other wireless devices, determine, based on the speed of the first wireless device and the subcarrier spacing, a reference signal pattern of a reference signal for demodulating data, and transmit the data and the reference signal to the one or more other wireless devices, the reference signal being transmitted in accordance with the reference signal pattern.

In some examples of the method, apparatuses, and non-transitory computer-readable medium described herein, transmitting the data and indication of the reference signal pattern may include operations, features, means, or instructions for broadcasting the data and the reference signal to the one or more other wireless devices.

Some examples of the method, apparatuses, and non-transitory computer-readable medium described herein may further include operations, features, means, or instructions for transmitting an indication of the reference signal pattern to the one or more other wireless devices. In some examples of the method, apparatuses, and non-transitory computer-readable medium described herein, the indication may be transmitted within control information to the one or more other wireless devices.

A method of wireless communications at a first wireless device is described. The method may include transmitting assistance information to a base station, the assistance information associated with a speed of the first wireless device, or a location of the first wireless device, or a combination thereof, receiving, from the base station, an indication of an adaptive reference signal pattern of a reference signal for demodulating data, the adaptive reference signal pattern being based on the assistance information, and transmitting the data and the reference signal to a second wireless device, the reference signal being transmitted in accordance with the adaptive reference signal pattern.

An apparatus for wireless communications at a first wireless device is described. The apparatus may include a processor and memory coupled to the processor. The processor and memory may be configured to cause the apparatus to transmit assistance information to a base station, the assistance information associated with a speed of the first wireless device, or a location of the first wireless device, or a combination thereof, receive, from the base station, an indication of an adaptive reference signal pattern of a reference signal for demodulating data, the adaptive reference signal pattern being based on the assistance information, and transmit the data and the reference signal to a second wireless device, the reference signal being transmitted in accordance with the adaptive reference signal pattern.

Another apparatus for wireless communications at a first wireless device is described. The apparatus may include means for transmitting assistance information to a base station, the assistance information associated with a speed of the first wireless device, or a location of the first wireless device, or a combination thereof, receiving, from the base station, an indication of an adaptive reference signal pattern of a reference signal for demodulating data, the adaptive reference signal pattern being based on the assistance information, and transmitting the data and the reference signal to a second wireless device, the reference signal being transmitted in accordance with the adaptive reference signal pattern.

A non-transitory computer-readable medium storing code for wireless communications at a first wireless device is described. The code may include instructions executable by a processor to transmit assistance information to a base station, the assistance information associated with a speed of the first wireless device, or a location of the first wireless device, or a combination thereof, receive, from the base station, an indication of an adaptive reference signal pattern of a reference signal for demodulating data, the adaptive reference signal pattern being based on the assistance information, and transmit the data and the reference signal to a second wireless device, the reference signal being transmitted in accordance with the adaptive reference signal pattern.

In some examples of the method, apparatuses, and non-transitory computer-readable medium described herein, the adaptive reference signal pattern may be from one or more reference signal patterns, each of the one or more reference signal patterns corresponding to a respective speed, or a range of speeds, or a combination thereof.

Some examples of the method, apparatuses, and non-transitory computer-readable medium described herein may further include operations, features, means, or instructions for operating under a mode for sidelink communications, where the first wireless device includes a first UE and the second wireless device includes a second UE.

In some examples of the method, apparatuses, and non-transitory computer-readable medium described herein, the adaptive reference signal pattern includes one or more symbol periods during which the reference signal may be transmitted and a gap between each of the one or more symbol periods.

A method of wireless communications at a first wireless device is described. The method may include receiving, from one or more other wireless devices, feedback information in response to one or more previous data transmissions to the one or more other wireless devices, determining a reference signal pattern of a reference signal for demodulating data, the reference signal pattern being based on the feedback information, and transmitting the data and the reference signal to the one or more other wireless devices, the reference signal being transmitted in accordance with the reference signal pattern.

An apparatus for wireless communications at a first wireless device is described. The apparatus may include a processor and memory coupled to the processor. The processor and memory may be configured to cause the apparatus to receive, from one or more other wireless devices, feedback information in response to one or more previous data transmissions to the one or more other wireless devices, determine a reference signal pattern of a reference signal for demodulating data, the reference signal pattern being based on the feedback information, and transmit the data and the reference signal to the one or more other wireless devices, the reference signal being transmitted in accordance with the reference signal pattern.

Another apparatus for wireless communications at a first wireless device is described. The apparatus may include means for receiving, from one or more other wireless devices, feedback information in response to one or more previous data transmissions to the one or more other wireless devices, determining a reference signal pattern of a reference signal for demodulating data, the reference signal pattern being based on the feedback information, and transmitting the data and the reference signal to the one or more other wireless devices, the reference signal being transmitted in accordance with the reference signal pattern.

A non-transitory computer-readable medium storing code for wireless communications at a first wireless device is described. The code may include instructions executable by a processor to receive, from one or more other wireless devices, feedback information in response to one or more previous data transmissions to the one or more other wireless devices, determine a reference signal pattern of a reference signal for demodulating data, the reference signal pattern being based on the feedback information, and transmit the data and the reference signal to the one or more other wireless devices, the reference signal being transmitted in accordance with the reference signal pattern.

In some examples of the method, apparatuses, and non-transitory computer-readable medium described herein, determining the reference signal pattern may include operations, features, means, or instructions for computing an error rate over a time period based on the feedback information, and determining the reference signal pattern based on the error rate satisfying an error rate threshold.

In some examples of the method, apparatuses, and non-transitory computer-readable medium described herein, the error rate includes a block error rate or a packet error rate of the one or more previous data transmissions.

In some examples of the method, apparatuses, and non-transitory computer-readable medium described herein, determining the reference signal pattern may include operations, features, means, or instructions for measuring a received power of the feedback information, and determining the reference signal pattern based on the received power satisfying a power threshold.

In some examples of the method, apparatuses, and non-transitory computer-readable medium described herein, the feedback information includes one or more negative acknowledgments received during a time period.

BRIEF DESCRIPTION OF THE DRAWINGS

FIGS. 3A, 3B, 3C, 3D, and 3E illustrate examples of reference signal patterns that support reference signal patterns based on relative speed between a transmitter and receiver in accordance with one or more aspects of the present disclosure.

DETAILED DESCRIPTION

Figure 1:
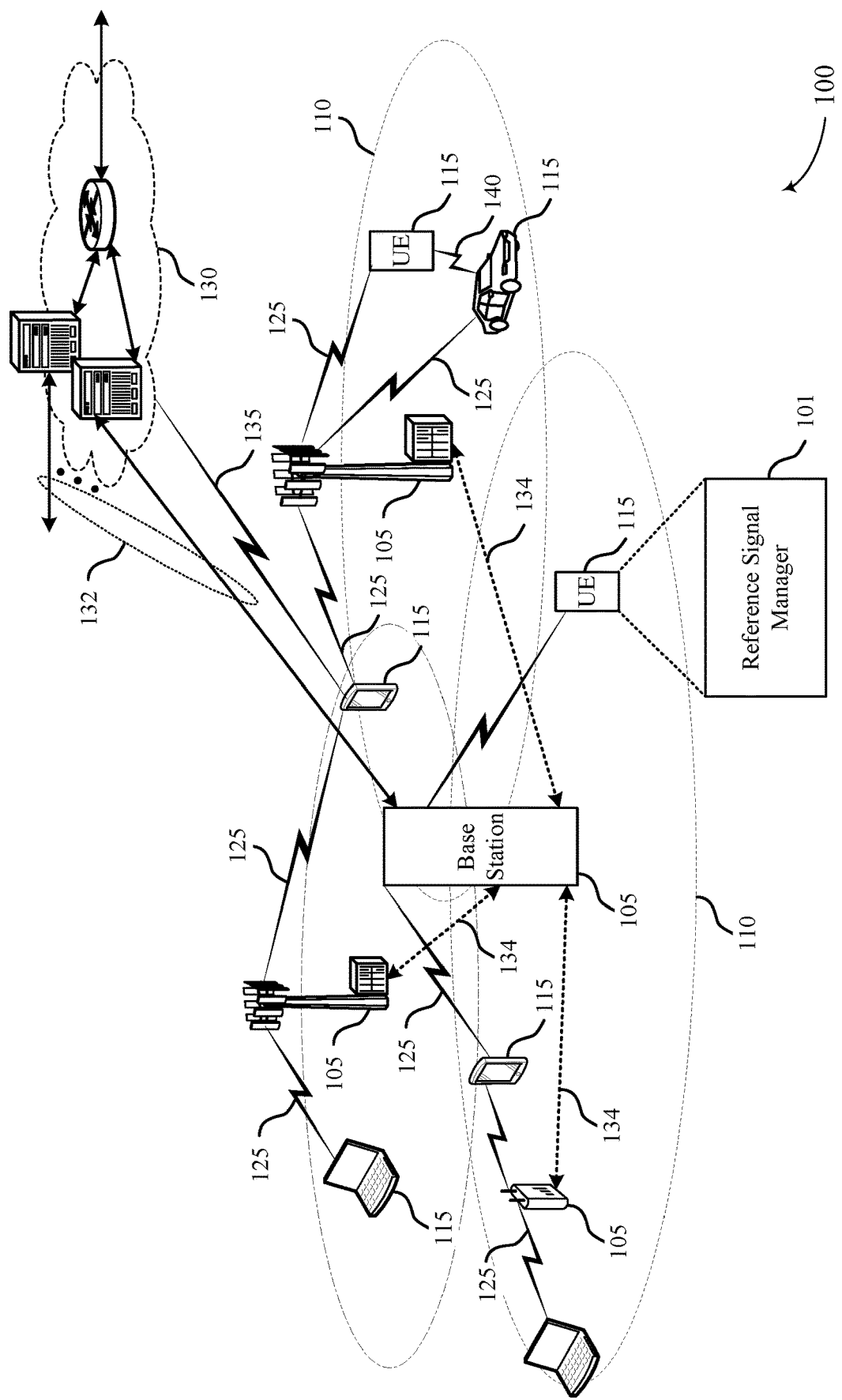
FIG. 1 illustrates an example of a system for wireless communications that supports reference signal patterns based on relative speed between a transmitter and receiver in accordance with one or more aspects of the present disclosure.

Wireless communications devices operating in a system that supports sidelink communications (e.g., a vehicle-to-everything (V2X) system, a vehicle-to-vehicle (V2V) system, a cellular-V2X (C-V2X) system, or other type of device-to-device (D2D) system) may communicate with each other while in motion. For example, a UE within a V2X system may be traveling at a velocity and may attempt to transmit or receive communications with a neighboring UE (e.g., via sidelink transmission) traveling at a different velocity to exchange information. In some cases, the difference in the UE's velocities may span a wide range (e.g., a few kilometers per hour (kmph) to about 500 kmph), which may make control information transmissions inefficient (e.g., poor quality or excess overhead signaling). In some cases, efficient transmission of reference signals (e.g., demodulation reference signal (DMRS)) may vary based on the relative speed between the UEs. For instance, when a relative speed between the UEs is high, techniques may be used to ensure the reference signals are properly presented (e.g., a higher time-domain density of reference signals may be present). However, when the relative speed between the UEs is low, fewer reference signals in time-domain may need to be transmitted than at higher relative speeds. If the same number of reference signals are transmitted for high and low relative speeds, then either the reference signal pattern may be inefficient for high relative speeds or there may be unnecessary overhead for signaling under low relative speeds, or both. This may result in ineffective wireless spectral use and poor sidelink performance. Therefore, a flexible design of reference signal patterns to ensure accurate and efficient decoding of control or data information (e.g., in channel estimation) at UEs of varying velocities may be beneficial.

An adaptive design of DMRS time density based on UE velocity may allow for an increase in DMRS density when relative speed is high and a decrease in DMRS density when relative speed is low. The DMRS design may include a number of different DMRS patterns of varying density corresponding to different speed ranges (e.g., two, three, or four DMRS patterns and corresponding speed ranges). In some examples, a UE may send assistance information (e.g., UE's speed, direction, location, relative speed, subcarrier spacing, and/or DMRS pattern index) to the transmitting UE (which may be referred to herein as a "transmitter," a transmitting wireless device, or other like terminology) to help identify an efficient DMRS pattern based on the relative speed between the two UEs. The transmitter may then transmit the DMRS and data to a receiving UE (which may be referred to herein as a "receiver," a receiving wireless device, or other like terminology) after the transmitter determines the DMRS pattern. Assistance information may be transmitted periodically, after a change of assistance information, or based on a trigger from a transmitter.

In another example, a UE may be unable to send or receive assistance information (e.g., UE's speed, direction, location, relative speed, subcarrier spacing, and/or DMRS pattern index). Thus, the transmitter may determine the DMRS pattern based on its own speed without information of the receiver's speed (e.g., in a broadcast transmission). The transmitter may then indicate the selected DMRS pattern in control information to one or more receivers followed by a transmission of the DMRS and data. In some cases, the UEs may utilize resources scheduled by a base station (e.g., when operating in mode 1 of sidelink communications). For instance, one or both of UEs may send assistance information (e.g., UE's speed, direction, location, relative speed, and/or DMRS pattern index) to the base station (e.g., gNB). The base station may determine the DMRS pattern to be used by the transmitting UE based on the received assistance information and then indicate the DMRS pattern to the transmitting UE. The transmitter may then transmit the DMRS, using the indicated pattern, and data.

In another example, a transmitting UE may determine the DMRS pattern to use with the receiving UE based on hybrid automatic repeat request (HARQ) feedback from the receiving UE. The HARQ feedback may help determine a DMRS pattern by identifying an error (e.g., block error rate (BLER) or packet error rate) that may be compared to a threshold to determine the DMRS pattern for subsequent transmissions. For example, if the BLER is above a threshold, a denser DMRS pattern may be used for the next transmission in comparison to the previous transmission. Additionally or alternatively, a negative acknowledgement (NACK) may be used to determine received power at the transmitter, and the received power may be compared to a threshold to determine the DMRS pattern for subsequent transmissions. For instance, if the received power is above a threshold, a denser DMRS pattern may be used for the next transmission in comparison to the previous transmission. For example, in groupcast communications, multiple UEs may fail in decoding and send NACK to the transmitting UE. In such cases, the transmitting UE may receive a relatively larger NACK received signal power if more UEs send NACK at the same time (e.g., as compared to receiving a single NACK) because NACK signals may be combined over the air. That is, the received power of NACK at transmitter may be larger if more UEs send NACK. Accordingly, a large received power for NACK may indicate that the transmitting UE may use a denser DMRS pattern than the previous transmission. The transmitter may then transmit the DMRS and data after the transmitter determines the DMRS pattern. In some cases, the HARQ feedback may be stored over time such that the error rate or received power for a UE may be tracked over time.

The UE may determine the DMRS pattern index using a mapping configuration. The mapping configuration may indicate a mapping between a DMRS pattern and a corresponding relative speed range or feedback thresholds. The mapping may be predefined (e.g., a table is stored at the UE), preconfigured (multiple tables may be stored at the UE), or configured by higher layer signaling (e.g., radio resource control (RRC) signaling). Additionally or alternatively, the DMRS pattern may be determined based on a numerology (e.g., a subcarrier spacing) used within a system.

Aspects of the disclosure are initially described in the context of wireless communications systems. Aspects of the disclosure are further illustrated by and described with reference to process flows, apparatus diagrams, system diagrams, and flowcharts that relate to transmitting DMRS for sidelink communications.

FIG. 1 illustrates an example of a wireless communications system 100 that supports reference signal patterns based on relative speed between a transmitter and receiver in accordance with one or more aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130). A UE 115 may communicate with the core network 130 through communication link 135.

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples, a receiving device may use a single receive beam to receive along a single beam direction (e.g., when receiving a data signal). The single receive beam may be aligned in a beam direction determined based listening according to different receive beam directions (e.g., a beam direction determined to have a highest signal strength, highest signal-to-noise ratio, or otherwise acceptable signal quality based listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use HARQ to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s$=1/30,720,000 seconds. Time intervals of a communications resource may be organized according to radio frames each having a duration of 10 milliseconds (ms), where the frame period may be expressed as $T_f$=307,200 $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100 and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)) and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples, the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In a V2X communications system, sidelink communications 140 (e.g., control or data transmissions) between UEs 115 may occur while one or both UEs 115 are moving. For example, UE 115 within a V2X system may be traveling at a velocity and may attempt to transmit or receive communications with a neighboring UE 115 (e.g., via sidelink transmission) traveling at a different velocity. In some cases, the difference in the UE's 115 velocities may span a wide range (e.g., a few kmph to about 500 kmph). This wide range of relative speed between the UEs 115 may make control information transmissions inefficient because efficient transmission of reference signals (e.g., DMRS) may vary based on the relative speed between the UEs 115. For instance, when relative speed between the UEs 115 is high, more reference signals in time may be utilized to ensure data is properly received (e.g., a higher density of reference signals may be present). However, when relative speed between the UEs 115 is low, fewer reference signals may need to be transmitted than at higher relative speeds. As such, a UE 115 may employ enhanced DMRS design to ensure efficient spectral use and improve sidelink performance.

An adaptive design of DMRS time density based on UE 115 velocity may allow for an increase in DMRS density in sidelink communications 140 when relative speed is high and a decrease in DMRS density when relative speed is low. The DMRS design may include a number of different DMRS patterns of varying density corresponding to different speed ranges (e.g., two, three, or four DMRS patterns and corresponding speed ranges), which will be discussed below in greater detail. In some examples, a UE 115 may send assistance information (e.g., UE's 115 speed, direction, location, relative speed, subcarrier spacing, and/or DMRS pattern index) to the transmitting UE 115 to help identify an efficient DMRS pattern based on the relative speed between the two UEs 115. The transmitter may then transmit the DMRS and data via sidelink communications 140 after the transmitter determines the DMRS pattern. Assistance information may be transmitted periodically, after a change of assistance information, or based on a trigger from a transmitter.

In another example, a UE 115 may be unable to send or receive assistance information (e.g., UE's 115 speed, direction, location, relative speed, subcarrier spacing, and/or DMRS pattern index). Thus, the transmitting UE 115 may determine the DMRS pattern based on its speed and/or the subcarrier spacing without information of the receiver's speed (e.g., in a broadcast system). The transmitter may then indicate the selected DMRS pattern in control information via sidelink communications 140 to the receiver followed by a transmission of the DMRS and data sidelink communications 140. In some cases, the UEs 115 may follow a sidelink schedule for sidelink communications 140 determined by a base station 105 (e.g., when UEs 115 are operating in mode 1). For instance, one or both of UEs 115 may send assistance information (e.g., UE's 115 speed, direction, location, relative speed, and/or DMRS pattern index) to the base station 105 (e.g., gNB). The base station 105 may determine the DMRS pattern to be used by the transmitting UE 115 based on the received assistance information and then indicate the DMRS pattern to the transmitting UE 115 via link 125. The transmitting UE 115 may then transmit the DMRS, using the indicated pattern, and data using sidelink communications 140.

In another example, a transmitting UE 115 may determine the DMRS pattern to use with the receiving UE 115 based on HARQ feedback from the receiving UE 115. The HARQ feedback may help determine a DMRS pattern by identifying an error (e.g., BLER or packed error) that may be compared to a threshold to determine the DMRS pattern for subsequent transmissions on sidelink communications 140. For example, if the BLER is above a threshold, a denser DMRS pattern may be used for the next transmission in comparison to the previous transmission. Additionally or alternatively, a NACK may be used to determine received power at the transmitting UE 115, and the received power may be compared to a threshold to determine the DMRS pattern for subsequent transmissions on sidelink communications 140. For instance, if the received power is above a threshold, a denser DMRS pattern may be used for the next transmission in comparison to the previous transmission. The transmitting UE 115 may then transmit the DMRS and data via sidelink communications 140 after the transmitting UE 115 determines the DMRS pattern. In some cases, the HARQ feedback may be stored over time such that the error rate or received power for UE 115 may be tracked over time.

UE 115 may determine the DMRS pattern index using a mapping configuration. The mapping configuration may indicate a mapping between a DMRS pattern and a corresponding relative speed range or feedback thresholds. The mapping may be predefined (e.g., a table is stored at UE 115), preconfigured (e.g., multiple tables may be stored at UE 115 where a mapping in the table may be preconfigured, or multiple tables may be specified, where one of the tables may be preconfigured for use), or configured by higher layer signaling (e.g., RRC signaling).

UEs 115 may include a reference signal manager 101, which may enable a UE 115 to identify a mapping configuration to use for determining DMRS patterns for relative speed ranges. The UE 115 may transmit or receive assistance information to determine the DMRS pattern for current operating conditions of UE 115. In some examples, the UE 115 may transmit data including the DMRS pattern, for example, in a sidelink communication 140 to another UE 115. In some examples, the reference signal manager 101 may transmit assistance information to a second wireless device, the assistance information associated with a speed of the first wireless device, or a location of the first wireless device, or a combination thereof and identify a reference signal pattern of a reference signal for demodulating data, the reference signal pattern based on the assistance information. In some cases, the reference signal manager 101 may also determine a speed of the first wireless device, identify a subcarrier spacing for communicating with one or more other wireless devices, determine, based on the speed of the first wireless device and the subcarrier spacing, a reference signal pattern of a reference signal for demodulating data, and transmit the data and the reference signal to the one or more other wireless devices, the reference signal being transmitted in accordance with the reference signal pattern.

Additionally or alternatively, the reference signal manager 101 may also transmit assistance information to a base station, the assistance information associated with a speed of the first wireless device, or a location of the first wireless device, or a combination thereof, receive, from the base station, an indication of a reference signal pattern of a reference signal for demodulating data, the reference signal pattern being based on the assistance information, and transmit the data and the reference signal to a second wireless device, the reference signal being transmitted in accordance with the reference signal pattern. The reference signal manager 101 may receive, from one or more other wireless devices, feedback information in response to one or more previous data transmissions to the one or more other wireless devices, determine a reference signal pattern of a reference signal for demodulating data, the reference signal pattern being based on the feedback information, and transmit the data and the reference signal to the one or more other wireless devices, the reference signal being transmitted in accordance with the reference signal pattern.

Figure 2:
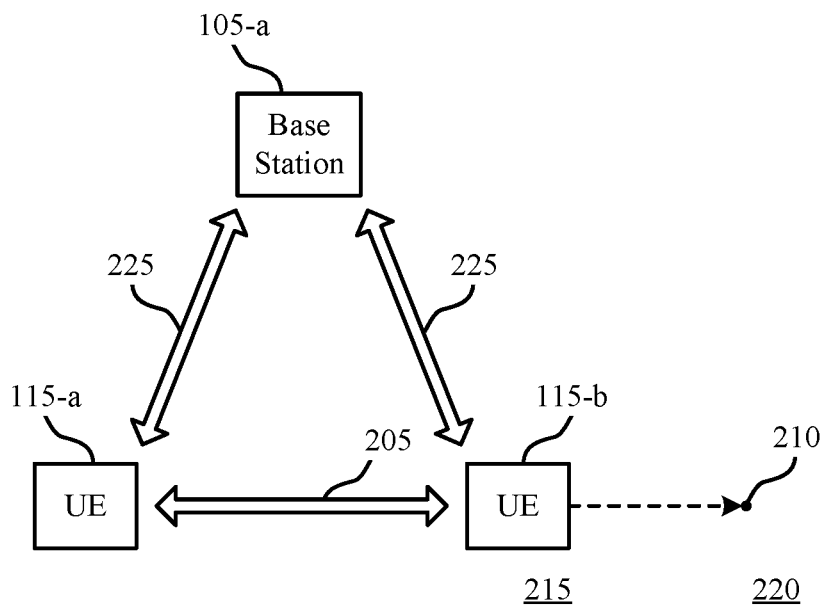
FIG. 2 illustrates an example of a wireless communications system that supports reference signal patterns based on relative speed between a transmitter and receiver in accordance with one or more aspects of the present disclosure.

FIG. 2 illustrates an example of a wireless communications system 200 that supports reference signal patterns based on relative speed between a transmitter and receiver in accordance with one or more aspects of the present disclosure. In some examples, wireless communications system 200 may implement aspects of wireless communications system 100. In some examples, the wireless communications system 200 may include UEs 115-*a* and 115-*b*, and base station 105-*a* which may be examples of a UE 115 and base station 105, respectively, described with reference to FIG. 1. It is noted that communications between two UEs 115 are illustrated in wireless communications system 200 for the sake of brevity, and the techniques described herein may be applicable to multiple UEs 115 within a system. For instance, UE 115-*a* may communicate with multiple UEs 115, for example, using broadcast or groupcast communications schemes.

In some cases, the UEs 115-*a* and 115-*b* may communicate with each other within a V2X system (e.g., using the sidelink communications 205) and may employ a flexible DMRS pattern design to enable efficient sidelink communications. For example, efficient transmissions of reference signals (e.g., DMRS) may vary based on the relative speed between UEs 115-*a* and 115-*b*. As described herein, the adaptive time density of DMRS based on UE 115-*a* or 115-*b* velocity may allow for an increase in DMRS density when relative speed between UEs 115-*a* and 115-*b* is high and a decrease in DMRS density when relative speed between UEs 115-*a* and 115-*b* is low. Further, system 200 may be divided into geographical zones (e.g., zone 215 and 220), shown by the dotted lines.

According to some aspects, the DMRS design may include a number of different DMRS patterns of varying density corresponding to different speed categories (e.g., two, three, or four DMRS patterns and corresponding speed ranges) to be used for data channel estimation. For instance, UE 115-*a* may attempt to decode sidelink communications 205 (e.g., data transmissions) from the UE 115-*b* when one or both of UEs 115-*a* and 115-*b* are in motion. For example, UE 115-*b* within wireless communications system 200 may be traveling at a relatively low speed (e.g., 10 kmph in a direction) to point 210 and may attempt to transmit or receive communications with a stationary neighboring UE 115-*a* (e.g., via sidelink transmission 205). Assistance information (e.g., a speed, direction, location (e.g., zone ID), relative speed, subcarrier spacing, and/or DMRS pattern index of a UE 115) from one or both UEs 115-*a* and 115-*b* may be used to determine the relative speed between UEs 115-*a* and 115-*b*. In some cases, the difference in the velocities of the UEs 115 (e.g., relative speed between one another) may be categorized (e.g., mapped) into a speed category (e.g., low: 0-60 kmph, medium: 61-120 kmph, or high: greater than 120 kmph), where a different DMRS pattern may correspond to each speed category (e.g., low, medium, and high). Example DMRS patterns are shown in FIG. 3 and described in greater detail herein. The variable DMRS design (e.g., use of assistance information) may vary based on the system's 200 configurations (e.g., unicast, groupcast, or broadcast).

In some examples, UE 115-*a* may send assistance information (e.g., UE's 115-*a* speed, direction, location (e.g., zone ID), relative speed, subcarrier spacing, and/or DMRS pattern index) to the transmitting UE 115-*b* to help identify an efficient DMRS pattern based on the relative speed between the two UEs 115-*a* and 115-*b*. In some examples, assistance information may be transmitted in sidelink channel information (SCI), a sidelink data channel (SL-SCH) (e.g., MAC control element (CE)), or a feedback channel. In some cases, relative speed and/or a DMRS pattern index may be determined at UE 115-*a* when UE 115-*a* has assistance information about UE 115-*b*. The transmitting UE 115-*b* may then transmit the DMRS and data after the transmitting UE 115-*b* determines the DMRS pattern based on the assistance information. Assistance information may be transmitted periodically (e.g., according to a schedule), after a change of assistance information (e.g., change in speed and/or direction of UE 115-*a* or 115-*b*), or based on a trigger from a transmitting UE 115-*b*. This example is described in greater detail in FIG. 4.

In another example, UE 115-*b* may operate in a broadcast configuration and may not receive transmissions from the receiver UE 115-*a*. Accordingly, UE 115-*b* may be unable to receive assistance information (e.g., UE's speed, direction, location, relative speed, subcarrier spacing, and/or DMRS pattern index) from UE 115-*a*. Thus, the transmitting UE 115-*b* may determine the DMRS pattern based on its speed without information of the receiving UE's 115-*a* speed. The transmitting UE 115-*b* may then indicate the selected DMRS pattern in control information via sidelink 205 to the receiving UE 115-*a* followed by a transmission of the DMRS and data via sidelink 205. This example is described in greater detail in FIG. 5.

In some cases, the UEs 115-*a* and 115-*b* may utilize resources (e.g., over sidelink 205) scheduled by base station 105-*a* (e.g., when operating in mode 1 of a sidelink communications scheme). In such cases, one or both of UEs 115-*a* and 115-*b* may send assistance information (e.g., UE's own speed, direction, location, relative speed, and/or DMRS pattern index) to the base station 105-*a* (e.g., gNB) via links 225. In some examples, assistance information may be transmitted in uplink channel information (UCI), a data channel (PUSCH) (e.g., MAC control element (CE)), or a feedback channel. The base station 105-*a* may then determine the DMRS pattern to be used by the transmitting UE 115-*a* based on the received assistance information and then indicate the DMRS pattern to the transmitting UE 115-*a* via link 225. The transmitting UE 115-*a* may then transmit the DMRS, using the indicated pattern, and data to the receiving UE 115-*b* via sidelink 205. This example is described in greater detail in FIG. 6.

In another example, a transmitting UE 115-*a* may determine the DMRS pattern to use with the receiving UE 115-*b* based on HARQ feedback from the receiving UE 115-*b*. The HARQ feedback may help determine a DMRS pattern by identifying an error (e.g., BLER or packed error) that may be compared to a threshold to determine the DMRS pattern for subsequent transmissions via sidelink 205 (e.g., in a unicast configuration). For example, if the BLER satisfies a threshold, a denser DMRS pattern may be used for the next transmission via sidelink 205 in comparison to the previous transmission via sidelink 205. Additionally or alternatively, a negative acknowledgement (NACK) may be used to determine received power at the transmitting UE 115-*a*, and the received power may be compared to a threshold to determine the DMRS pattern for subsequent transmissions via sidelink 205 (e.g., in a groupcast configuration). For instance, if the received power is above a threshold, a denser DMRS pattern may be used for the next transmission via sidelink 205 in comparison to the previous transmission via sidelink 205. For example, in a groupcast deployment, multiple UEs 115 may fail in decoding and send feedback information (e.g., NACK) to the transmitting UE 115-*a*. In cases, where the transmitting UE 115-*a* receives a larger NACK received signal power (e.g., because NACK signals may be combined over the air), the transmitting UE 115-*a* may determine that a denser DMRS pattern may be used (e.g., as compared to the DMRS pattern used for the previous transmission). The transmitting UE 115-*a* may then transmit the DMRS and data via sidelink 205 after the transmitting UE 115-*a* determines the DMRS pattern. In some cases, the HARQ feedback may be stored over time such that the error rate or received power for a UE may be tracked over time. This example is described in greater detail in FIG. 7.

The UEs 115-*a* and 115-*b*, and base station 105-*a* may determine the DMRS pattern index using a mapping configuration. The mapping configuration may indicate a one-to-one mapping between a DMRS pattern and a corresponding relative speed range or feedback thresholds. For example, two speed categories and DMRS patterns may be configured, such as a low speed category (e.g., 0 to 120 kmph) may correspond to a low density DMRS pattern, while a high speed category (e.g., greater than 120 kmph) may correspond to a high density DMRS pattern. The mapping may be predefined (e.g., a table is stored at the UEs 115-*a* and 115-*b*), preconfigured (multiple tables may be stored at the UEs 115-*a* and 115-*b*), or configured by higher layer signaling (e.g., RRC signaling from base station 105-*a*).

In some examples, a DMRS pattern may be determined for more than one UE 115 when the system is operating in a broadcast or groupcast configuration. Each receiving UE 115 may be moving at different speed, but one DMRS pattern may be used for all UEs 115. The DMRS pattern may be based on assistance information from one or more UEs 115 and may account for the different conditions of each sidelink 205 with each UE 115. For instance, a DMRS pattern may be selected based on the worst sidelink 205 (e.g., highest relative speed between UEs 115). For example, the DMRS pattern with the highest DMRS time density of indicated DMRS patterns from receiving UEs 115 may be selected.

Alternatively, a DMRS pattern may be selected based on the worst sidelink 205 and a BLER target. For example, the DMRS pattern may be selected within an error tolerance (e.g., 5% or 15%) such that not every receiving UE 115 is ensured successful decoding of the data channel. For example, transmitting UE 115 receives assistance info from 30 receiving UEs 115 and determines the relative speed for the 30 links based on three speed categories: low, medium, and high. 28 of the links within the low to medium relative speed categories, and 2 within the high relative speed category. If the BLER target is 0.1 (i.e., tolerance to 10% error), then the DMRS pattern may be selected based on the medium speed category. Therefore, the two UEs 115 within the high speed category may not decode correctly, but the BLER target can still be met.

The DMRS pattern may be based on subcarrier spacing since a larger subcarrier spacing may correspond to a smaller (e.g., shorter) OFDM symbol duration, and a DMRS pattern that works for larger subcarrier spacing may not work for smaller subcarrier spacing because a smaller subcarrier spacing may need a denser DMRS pattern than larger subcarrier spacing, even within the same or similar relative speeds. For example, when the transmitting UE 115 is transmitting with 30 kHz subcarrier spacing, a pattern with DMRS in three symbols (e.g., as described herein and shown in FIG. 3D) may be determined (medium speed category) for a relative speed of 100 kmph. However, when the transmitting UE 115 is transmitting with 15 kHz subcarrier spacing, a reference signal pattern with DMRS in six symbols (e.g., as described herein and as shown in FIG. 3E) may be determined (high speed category) for a relative speed of 100 kmph (e.g., due to a relatively longer duration of a slot). In another example, when the transmitting UE 115 is transmitting with 60 kHz subcarrier spacing, the pattern with DMRS in two symbols (e.g., as described herein and as shown in FIG. 3C) may be determined (low speed category) for a relative speed of 100 kmph (e.g., due to a relatively shorter duration of a slot).

FIGS. 3A through 3E illustrate an example of reference signal patterns 300 that support reference signal patterns based on relative speed between a transmitter and receiver in accordance with one or more aspects of the present disclosure. In some examples, the DMRS patterns 300-*a* through 300-*e* may implement aspects of wireless communications systems 100 or 200 or may be implemented by a UE 115 such as a vehicle (or other wireless device in a V2X system), as described herein.

As shown in FIG. 3A, the reference signal pattern 300-*a* (e.g., a DMRS pattern) may include OFDM symbols 305 with DMRS 310 or without DMRS 310. For example, symbol 315 may be an example of an OFDM symbol 305 without DMRS 310, and symbol 320 may be an example of an OFDM symbol 305 with DMRS 310. In some examples, a symbol 320 with DMRS 310 may be transmitted every seventh symbol, such that there are six symbols 315 without DMRS 310 between each symbol 320 with DMRS 310. In some cases, more symbols 315 without DMRS 310 may be present between each symbol 320 with DMRS 310 (e.g., as compared to other DMRS patterns 300).

As shown in FIG. 3B, the reference signal pattern 300-*b* may include OFDM symbols 305 with DMRS 310 or without DMRS 310. For example, symbol 315 may be an example of a symbol 305 without DMRS 310, and symbol 320 may be an example of a symbol 305 with DMRS 310. In some examples, a symbol 320 with DMRS 310 may be transmitted every third or fourth symbol such that there are two or three symbols 315 without DMRS 310 between each symbol 320 with DMRS 310, respectively.

In some examples, the reference signal patterns 300-*a* and 300-*b* may be used when two speed categories are used. For instance, a low speed category (e.g., 0 to 100 kmph) may correspond to DMRS pattern 300-*a*, while a high speed category (e.g., greater than 100 kmph) may correspond to DMRS pattern 300-*b*. This example does not limit the number of categories to two, and more or less categories and corresponding DMRS patterns may be used. For example, three categories are described with reference to FIGS. 3C-3E. In some examples, the mapping described here corresponds to a specific subcarrier spacing, for example, for 30 kHz subcarrier spacing. When subcarrier spacing is different is different, the mapping is different. For example, when subcarrier spacing is 60 kHz, pattern 300-*b* corresponds to a high speed category (e.g., greater than 200 kmph).

As shown in FIG. 3C, the reference signal pattern 300-*c* may include OFDM symbols 305 with DMRS 310 or without DMRS 310. For example, symbol 315 may be an example of a symbol 305 without DMRS 310, and symbol 320 may be an example of a symbol 305 with DMRS 310. In some examples, a symbol 320 with DMRS 310 may be transmitted every tenth symbol such that there are nine symbols 315 without DMRS 310 between each symbol 320 with DMRS 310, respectively.

As shown in FIG. 3D, the reference signal pattern 300-*d* may include OFDM symbols 305 with DMRS 310 or without DMRS 310. For example, symbol 315 may be an example of a symbol 305 without DMRS 310, and symbol 320 may be an example of a symbol 305 with DMRS 310. In some examples, a symbol 320 with DMRS 310 may be transmitted every fifth symbol such that there are four symbols 315 without DMRS 310 between each symbol 320 with DMRS 310, respectively.

As shown in FIG. 3E, the reference signal pattern 300-*e* may include OFDM symbols 305 with DMRS 310 or without DMRS 310. For example, symbol 315 may be an example of a symbol 305 without DMRS 310, and symbol 320 may be an example of a symbol 305 with DMRS 310. In some examples, a symbol 320 with DMRS 310 may be transmitted every other symbol such that there is one symbol 315 without DMRS 310 between each symbol 320 with DMRS 310, respectively. The DMRS pattern may last for one or more slots (e.g., fourteen symbols).

In some examples, the reference signal patterns 300-*c*, 300-*d*, and 300-*e* may be used when three speed categories are used. For instance, a low speed category (e.g., 0 to 60 kmph) may correspond to DMRS pattern 300-*c*, while a medium speed category (e.g., 60 to 150 kmph) may correspond to DMRS pattern 300-*d*, and a high speed category (e.g., greater than 150 kmph) may correspond to DMRS pattern 300-*e*. This example does not limit the number of categories to three, and more or less categories and corresponding DMRS patterns may be used. For example, four speed categories may be used corresponding to DMRS patterns 300-c, 300-a, 300-d, and 300-e, from lowest to highest speed categories respectively. Additional categories or mapping may be used for different subcarrier spacing. For example, mapping may be based on speed and/or subcarrier spacing, such that mapping may be different from categories containing only speed. For instance, the range of a speed category may be different when subcarrier spacing is considered or each subcarrier spacing may have a mapping table as an alternative or in addition to the speed mapping tables.

Figure 4:
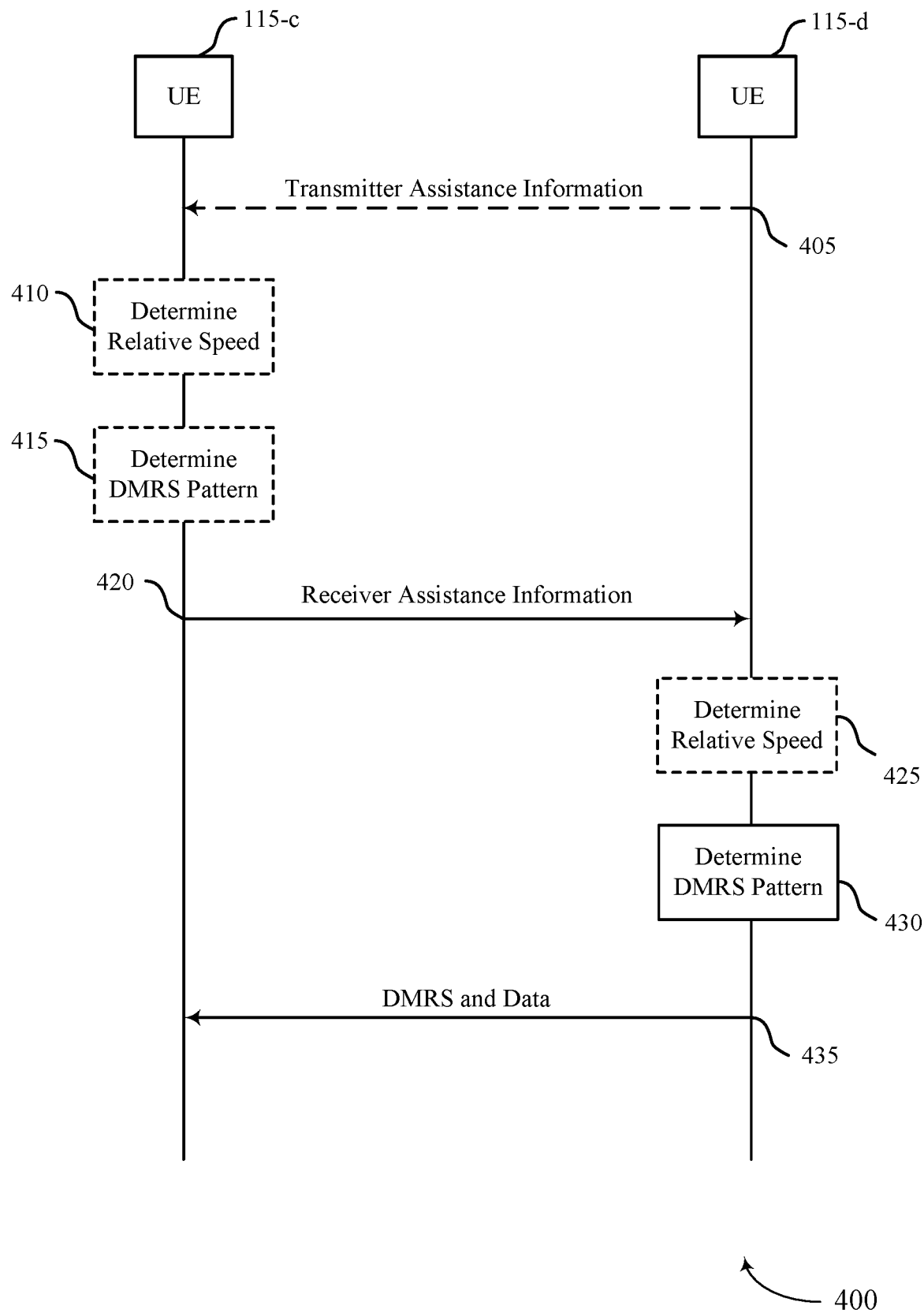
FIGS. 4 through 7 illustrate examples of a process flow in a system that supports reference signal patterns based on relative speed between a transmitter and receiver in accordance with one or more aspects of the present disclosure.

FIG. 4 illustrates an example of a process flow 400 that supports reference signal patterns based on relative speed between a transmitter and receiver in accordance with one or more aspects of the present disclosure. In some examples, process flow 400 may implement aspects of wireless communications system 100. Process flow 400 may be implemented by a UE 115-c and UE 115-d, or any other examples of UEs 115 as described herein. Alternative examples of the following may be implemented, where some steps are performed in a different order than described or are not performed at all. In some cases, steps may include additional features not mentioned below, or further steps may be added.

At 405, UE 115-c may optionally receive transmitter assistance (e.g., UE's 115-d speed, direction, location (e.g., zone ID), relative speed, subcarrier spacing, and/or DMRS pattern index) information from UE 115-d. The transmitter assistance information may be transmitted for other purposes than DMRS pattern design determination but may still be used by UE 115-c, which may reduce signal overhead between UE 115-c and UE 115-d by reducing the addition of DMRS pattern design specific assistance information.

In some examples, assistance information may be transmitted in SCI, a sidelink data channel (SL-SCH) (e.g., MAC CE), or a feedback channel. Assistance information may be transmitted periodically (e.g., according to a predefined or preconfigured time period, indicated by RRC signaling), after a change of assistance information (e.g., change in speed, direction, location and/or relative speed of UE 115-c or 115-d), or based on a trigger from a receiving UE 115-c. More specifically, a change of assistance information at UE 115-d may include when the change of speed exceeds a threshold (e.g., a change of absolute value is larger than a threshold, or change from one speed category to another: low to medium), a change of direction exceeds a threshold, the location is changed (e.g., zone ID changed), the change of relative speed exceeds a threshold (if UE 115-d determines relative speed of UEs 115-c and 115-d), and/or the determined DMRS pattern is changed (if UE 115-d determines DMRS pattern).

In some cases, speed may be indicated by an index mapped from absolute speed. For example, three indices to indicate low, medium, and high speed, and each of the three indices corresponds to a speed range (e.g., low: less than or equal to 60 kmph, mid: greater than 60 and less than or equal to 120 kmph, and high: greater than 120 kmph). In some examples, direction may be indicated by an index mapped from UE's 115 absolute direction. For instance, the degree from north direction, rounded to a finite set of directions (e.g., eight directions mapped from [0, 360) degrees, resulting in eight equal ranges of 45 degrees).

In some examples, speed and/or direction may be determined by a UE's 115 location (e.g., zone ID) included in the assistance information. For instance, a UE 115 may know what zone it is in (e.g., zone 215 or zone 220) where a zone is a geographical area with a corresponding zone ID. From the change rate of zones (e.g., zone IDs), a moving speed can be determined at UE 115-c or 115-d over time. For instance, the size of each zone may be known, and based on the location of a UE 115 in different zones over time, the speed of the UE 115 may be determined.

At 410, UE 115-c may optionally determine a relative speed between itself, UE 115-c, and UE 115-d. In some cases, this determination may be based on the received transmitter assistance information. For example, if UE 115-c is in speed category low in a first direction, and UE 115-d is in speed category low in a second direction, and if the first and second directions are opposite, then the relative speed is determined as within the medium speed category if a three category system is used (e.g., FIGS. 3C through 3E).

At 415, UE 115-c may optionally determine a DMRS pattern and corresponding index based on the determination of relative speed at 410. Example DMRS patterns are shown in FIGS. 3A-3E.

At 420, UE 115-c may transmit receiver assistance information to UE 115-d, which may be similar to transmitter assistance information. In some cases, this assistance information may include UE's 115-c speed, direction, location (e.g., zone ID), relative speed, subcarrier spacing, and/or DMRS pattern index. The assistance information may include a DMRS pattern index based on the determination of a DMRS pattern at 415. In some examples, assistance information may be transmitted in SCI, a sidelink data channel (SL-SCH) (e.g., MAC CE), or a feedback channel. Assistance information may be transmitted periodically (e.g., according to a schedule), after a change of assistance information (e.g., change in speed and/or direction of UE 115-a or 115-b), or based on a trigger from a transmitting UE 115-b. More specifically, a change of assistance information at UE 115-c may include when the change of speed exceeds a threshold (e.g., a change of absolute value is larger than a threshold, or change from one speed category to another: low to medium), a change of direction exceeds a threshold, the location is changed (e.g., zone ID changed), the change of relative speed exceeds a threshold (if UE 115-c determines relative speed of UEs 115-c and 115-d), and/or the determined DMRS pattern is changed (if UE 115-c determines DMRS pattern).

At 425, UE 115-d may optionally determine a relative speed between itself, UE 115-d, and UE 115-d. In some cases, this determination may be based on the received receiver assistance information, as discussed above in relation to the determination at 410. For example, if UE 115-c is in speed category medium in a first direction, and UE 115-d is in speed category low in the same direction, then the relative speed is determined to be within the low speed category if a three category system is used (e.g., FIGS. 3C through 3E).

At 430, UE 115-d may determine a DMRS pattern based on the receiver assistance information and optionally the determination or relative speed at 425. Example DMRS patterns are shown in FIGS. 3A-3E. UE 115-d may maintain record of UE's 115-c past assistance information, and UE 115-d may redetermine a DMRS pattern when the assistance information changes. For example, UE 115-d may maintain ten receivers' speed information and determined the relative speeds for the ten sidelinks. UE 115-d may determine a DMRS pattern based on the relative speeds of the ten sidelinks, and UE 115-d continues using the DMRS pattern if no relative speed change (or the change is not large enough to trigger a change of DMRS pattern).

At 435, UE 115-*d* may transmit, to UE 115-*c*, using the DMRS pattern determined at 430 along with data. In some cases, an indication of the DMRS pattern to be used at 435 may be sent to UE 115-*c*.

Figure 5:
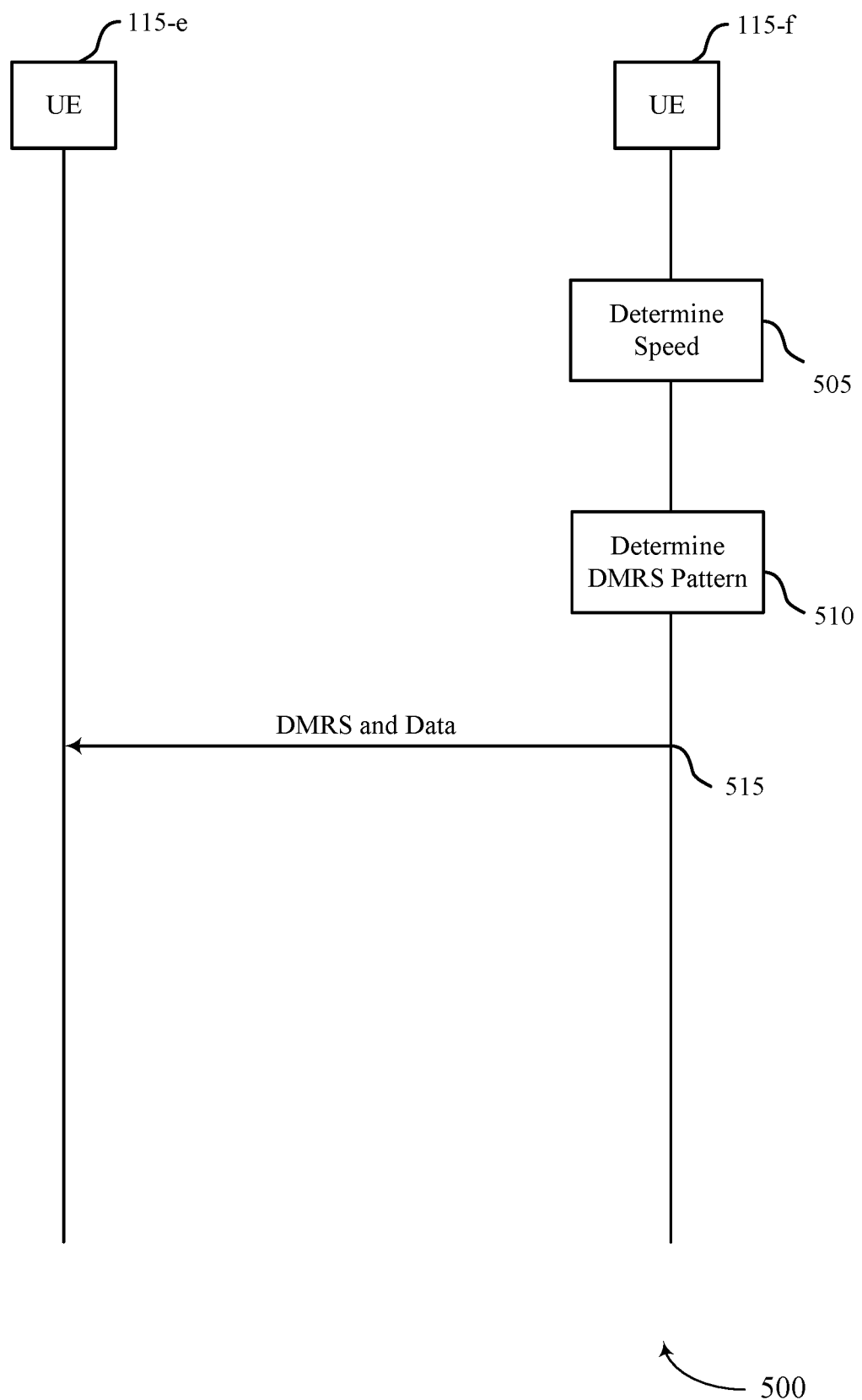

FIG. 5 illustrates an example of a process flow 500 that supports reference signal patterns based on relative speed between a transmitter and receiver in accordance with one or more aspects of the present disclosure. In some examples, process flow 500 may implement aspects of wireless communications system 100. Process flow 500 may be implemented by a UE 115-*e* and UE 115-*f*, or any other examples of UEs 115 as described herein. Alternative examples of the following may be implemented, where some steps are performed in a different order than described or are not performed at all. In some cases, steps may include additional features not mentioned below, or further steps may be added.

At 505, a UE 115-*f* may determine the speed (and optionally direction) of itself, UE 115-*f*. UE 115-*f* may operate in a broadcast configuration and may not receive transmissions from the receiver UE 115-*e*, and thus, UE 115-*f* may not be able to receive assistance information from UE 115-*e*. In some examples, UE 115-*e* may be unable to transmit assistance information to UE 115-*f*. In some cases, UE 115-*f* may assume UE 115-*e* is stationary or moving in the opposite direction at a similar speed as UE 115-*f*.

At 510, the UE 115-*f* may determine a DMRS pattern for the sidelink communications with UE 115-*e* based on the determined speed at 505. Example DMRS patterns are shown in FIGS. 3A-3E.

At 515, UE 115-*f* may transmit, to UE 115-*e*, using the DMRS pattern determined at 510 along with data. In some cases, an indication of the DMRS pattern to be used at 510 may be sent to UE 115-*e* (e.g., via SCI).

Figure 6:
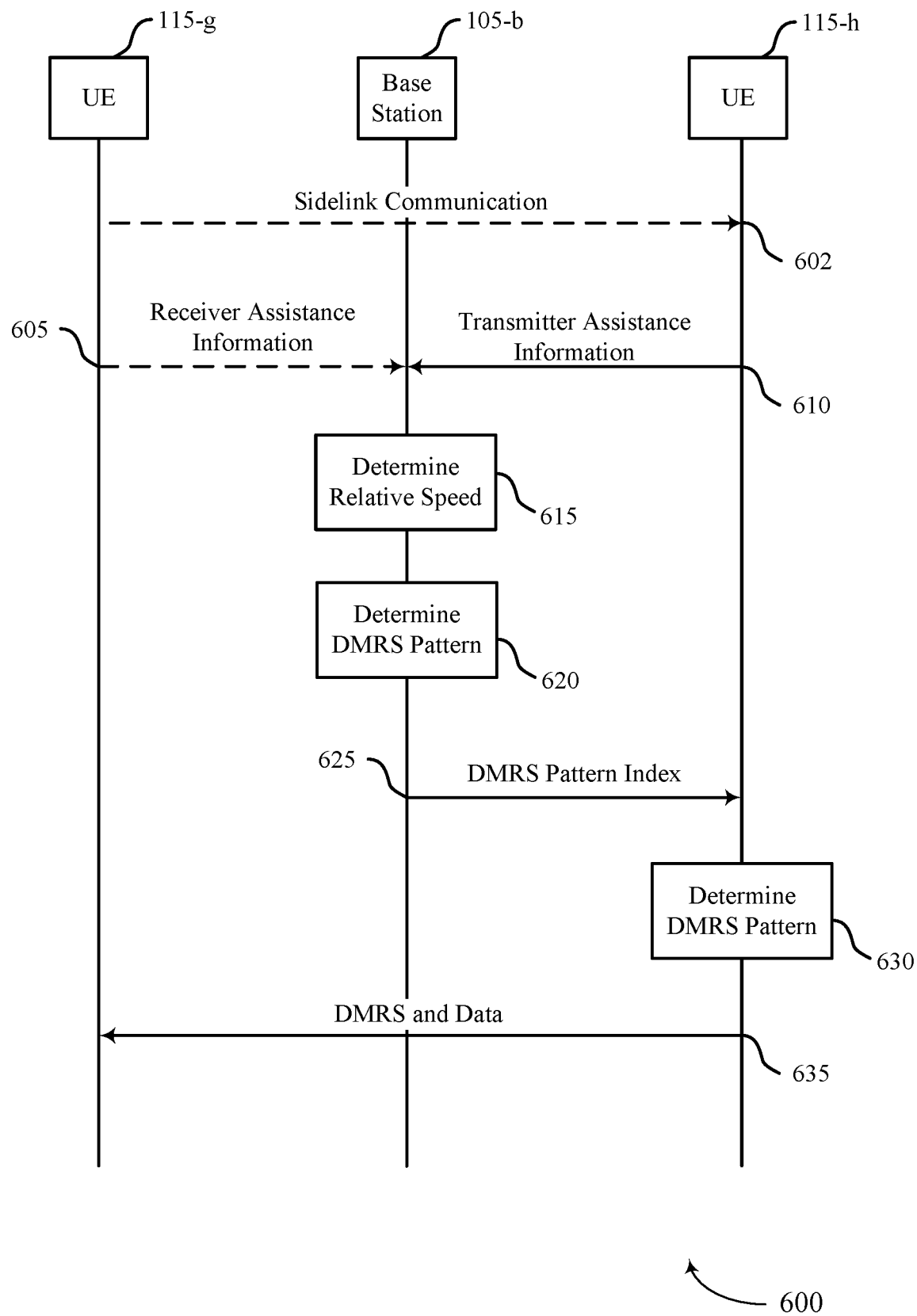

FIG. 6 illustrates an example of a process flow 600 that supports reference signal patterns based on relative speed between a transmitter and receiver in accordance with one or more aspects of the present disclosure. In some examples, process flow 600 may implement aspects of wireless communications system 100. Process flow 600 may be implemented by UE 115-*g*, UE 115-*e*, base station 105-*b*, or any other examples of UEs 115 or base stations 105 as described herein. Alternative examples of the following may be implemented, where some steps are performed in a different order than described or are not performed at all. In some cases, steps may include additional features not mentioned below, or further steps may be added.

At 602, UE 115-*g* may optionally transmit, to UE 115-*h*, sidelink communications. For example, UE 115-*g* may transmit data to UE 115-*h* for V2X or V2V communications. In some cases, UEs 115-*g* and 115-*h* may be operating in mode 1 such that base station 105-*b* assists in sidelink scheduling.

At 605, UE 115-*g* may optionally transmit receiver assistance information to base station 105-*b*. At 610, UE 115-*h* may transmit transmitter assistance information to base station 105-*b*. In some cases, one or both of receiver and transmitter assistance information may be transmitted to base station 105-*b*. In some cases, the assistance information may include each respective UE's 115-*g* or 115-*h* speed, direction, location (e.g., zone ID), relative speed, subcarrier spacing, and/or DMRS pattern index. In some examples, assistance information may be transmitted in UCI, a data channel (e.g., PUSCH, MAC CE), or a feedback channel.

At 615, base station 105-*b* may determine a relative speed between UE 115-*g* and UE 115-*h*. In some cases, this determination at 615 may be based on the received assistance information (e.g., receiver and/or transmitter assistance information), similar to the relative speed determinations in process flow 400.

At 620, base station 105-*b* may determine a DMRS pattern and corresponding DMRS pattern index based on the determination of relative speed at 615. At 625, base station 105-*b* may transmit, to UE 115-*h*, the DMRS pattern index based on the determination of a DMRS pattern at 620. Example DMRS patterns are shown in FIGS. 3A-3E.

At 630, UE 115-*h* may determine the DMRS pattern based on the received DMRS pattern index at 625 (e.g., based on the known mapping configuration). For example, two speed categories and DMRS patterns may be configured, such as a low speed category (e.g., 0 to 120 kmph) may correspond to a low density DMRS pattern, while a high speed category (e.g., greater than 120 kmph) may correspond to a high density DMRS pattern. The mapping may be predefined (e.g., a table is stored at the UEs 115-*g* and 115-*h*), preconfigured (multiple tables may be stored at the UEs 115-*g* and 115-*h*), or configured by higher layer signaling (e.g., RRC signaling from base station 105-*b*).

At 635, UE 115-*h* may transmit, to UE 115-*g*, using the DMRS pattern determined at 620 and 630 along with data. In some cases, an indication of the DMRS pattern to be used at 635 may be sent to UE 115-*g*.

Figure 7:
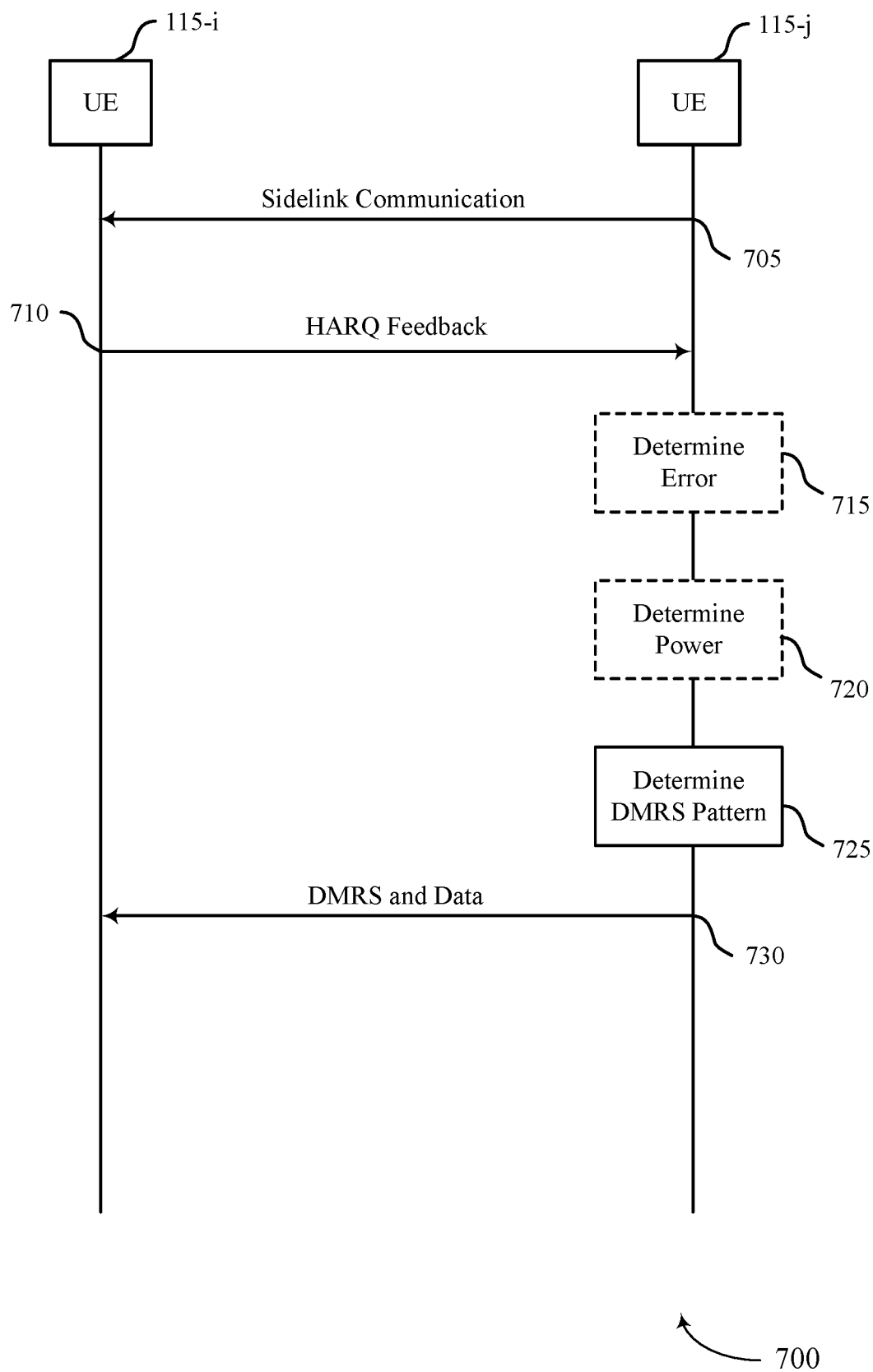

FIG. 7 illustrates an example of a process flow 700 that supports reference signal patterns based on relative speed between a transmitter and receiver in accordance with one or more aspects of the present disclosure. In some examples, process flow 700 may implement aspects of wireless communications system 100. Process flow 700 may be implemented by a UE 115-*i* and UE 115-*j*, or any other examples of UEs 115 as described herein. Alternative examples of the following may be implemented, where some steps are performed in a different order than described or are not performed at all. In some cases, steps may include additional features not mentioned below, or further steps may be added.

At 705, UE 115-*i* may receive a sidelink communication (e.g., data transmission) from UE 115-*j*. At 710, UE 115-*i* may transmit, to UE 115-*j*, HARQ feedback (e.g., acknowledgment (ACK) or NACK) for the sidelink communication received at 705.

At 715, UE 115-*j* may optionally determine an error based on the received HARQ feedback. In some cases, this error determination may be compared to a threshold and tracked over time, and UE 115-*j* may reselect a DMRS pattern when the error rate has changed. For example, UE 115-*j* may compute the BLER or packet error from HARQ feedback 710 over a time period, and if the BLER is higher than a target, the UE 115-*j* may determine that a DMRS pattern with denser DMRS symbol locations should be used in subsequent sidelink communications. Error determinations may apply to unicast configurations.

At 720, UE 115-*j* may optionally determine received power of the HARQ feedback (e.g., NACK when in a groupcast configuration with SFN feedback). In groupcast, only NACK(s) may be received by UE 115-*j*. In some cases, this received power may be compared to a threshold and tracked over time, and UE 115-*j* may reselect a DMRS pattern when the received power has changed. For example, UE 115-*j* may measure the received power of a NACK signal in HARQ feedback 710, and if the power is higher than a threshold, the UE 115-*j* may determine that a DMRS pattern with denser DMRS symbol locations should be used in subsequent sidelink communications. The received power measurement may be a one-shot measurement or measurement over multiple NACK receptions.

At 725, UE 115-*j* may determine (or redetermine) a DMRS pattern based on one or both of the comparisons of error and received power with their respective thresholds.

At 730, UE 115-*j* may transmit, to UE 115-*i*, using the DMRS pattern determined at 725 along with data. In some cases, an indication of the DMRS pattern to be used at 730 may be sent to UE 115-*i*.

Figure 8:
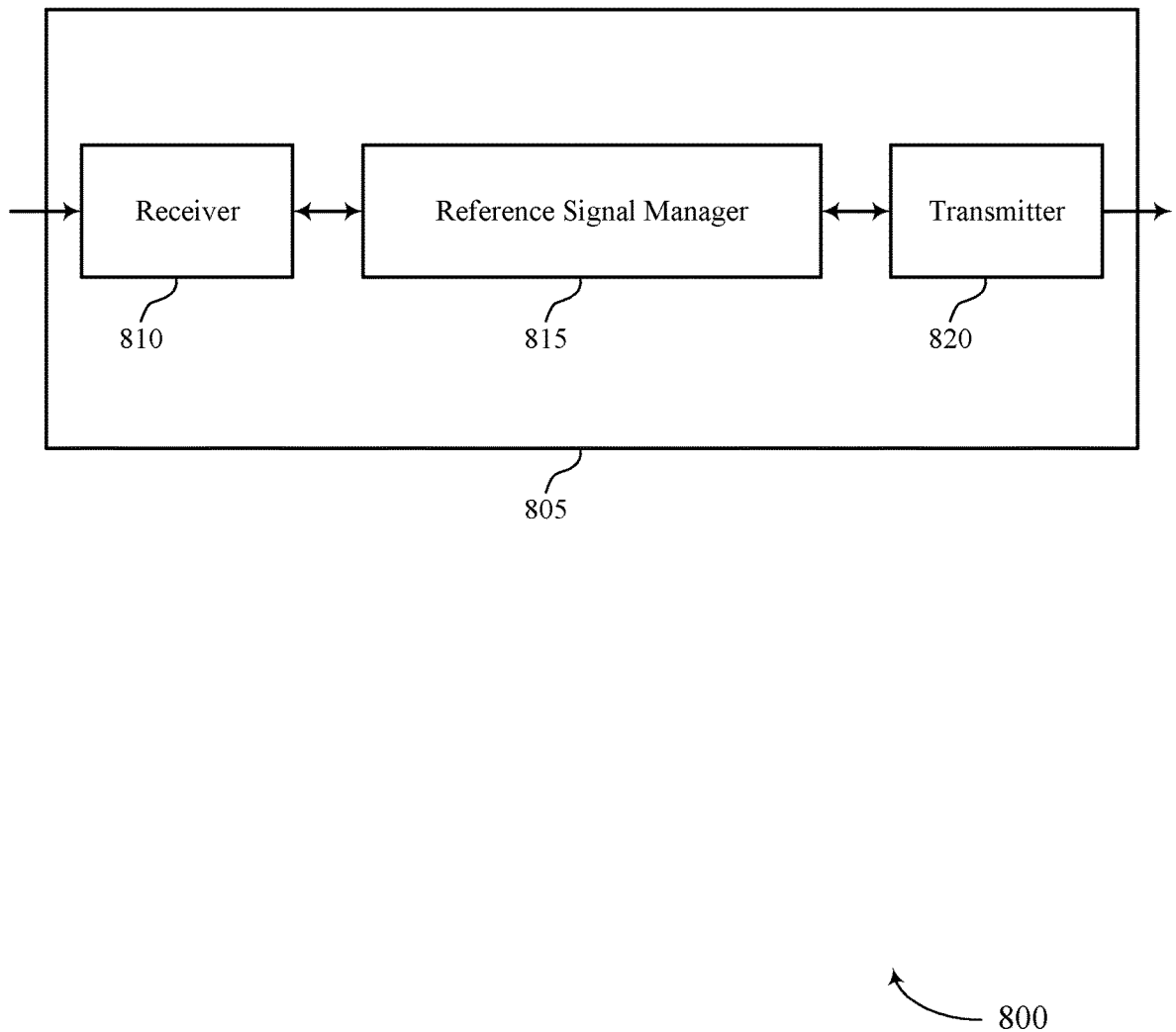
FIGS. 8 and 9 show block diagrams of devices that support reference signal patterns based on relative speed between a transmitter and receiver in accordance with one or more aspects of the present disclosure.

FIG. 8 shows a block diagram 800 of a device 805 that supports reference signal patterns based on relative speed between a transmitter and receiver in accordance with one or more aspects of the present disclosure. The device 805 may be an example of aspects of a UE 115 as described herein. The device 805 may include a receiver 810, a reference signal manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to reference signal patterns based on relative speed between a transmitter and receiver, etc.). Information may be passed on to other components of the device 805. The receiver 810 may be an example of aspects of the transceiver 1120 described with reference to FIG. 11. The receiver 810 may utilize a single antenna or a set of antennas.

The reference signal manager 815 may transmit assistance information to a second wireless device, the assistance information associated with a speed of the first wireless device, or a location of the first wireless device, or a combination thereof and determine an adaptive reference signal pattern of a reference signal for demodulating data, the adaptive reference signal pattern based on the assistance information. The reference signal manager 815 may also determine a speed of the first wireless device, identify a subcarrier spacing for communicating with one or more other wireless devices, determine, based on the speed of the first wireless device and the subcarrier spacing, a reference signal pattern of a reference signal for demodulating data, and transmit the data and the reference signal to the one or more other wireless devices, the reference signal being transmitted in accordance with the reference signal pattern. The reference signal manager 815 may also transmit assistance information to a base station, the assistance information associated with a speed of the first wireless device, or a location of the first wireless device, or a combination thereof, receive, from the base station, an indication of a reference signal pattern of a reference signal for demodulating data, the reference signal pattern being based on the assistance information, and transmit the data and the reference signal to a second wireless device, the reference signal being transmitted in accordance with the reference signal pattern. The reference signal manager 815 may also receive, from one or more other wireless devices, feedback information in response to one or more previous data transmissions to the one or more other wireless devices, determine a reference signal pattern of a reference signal for demodulating data, the reference signal pattern being based on the feedback information, and transmit the data and the reference signal to the one or more other wireless devices, the reference signal being transmitted in accordance with the reference signal pattern. The reference signal manager 815 may be an example of aspects of the reference signal manager 1110 described herein.

The actions performed by the reference signal manager 815 as described herein may be implemented to realize one or more potential advantages. One implementation may allow a UE 115 to save power and increase battery life by avoiding unsuccessful reception or transmission of communications when traveling at different speeds by optimizing the DMRS density for the current speed of the UE. Additionally or alternatively, the UE 115 may further reduce signaling overhead by reducing the DMRS density at slow speeds when dense DMRS is not needed for successful communications. Another implementation may provide improved quality and reliability of service at the UE 115, as latency and the number of separate resources allocated to the UE 115 may be optimized based on the DMRS density, which may be based on the speed or location of UE 115.

The reference signal manager 815, or its sub-components, may be implemented in hardware, code (e.g., software or firmware) executed by a processor, or any combination thereof. If implemented in code executed by a processor, the functions of the reference signal manager 815, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The reference signal manager 815, or its sub-components, may be physically located at various positions, including being distributed such that portions of functions are implemented at different physical locations by one or more physical components. In some examples, the reference signal manager 815, or its sub-components, may be a separate and distinct component in accordance with various aspects of the present disclosure. In some examples, the reference signal manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
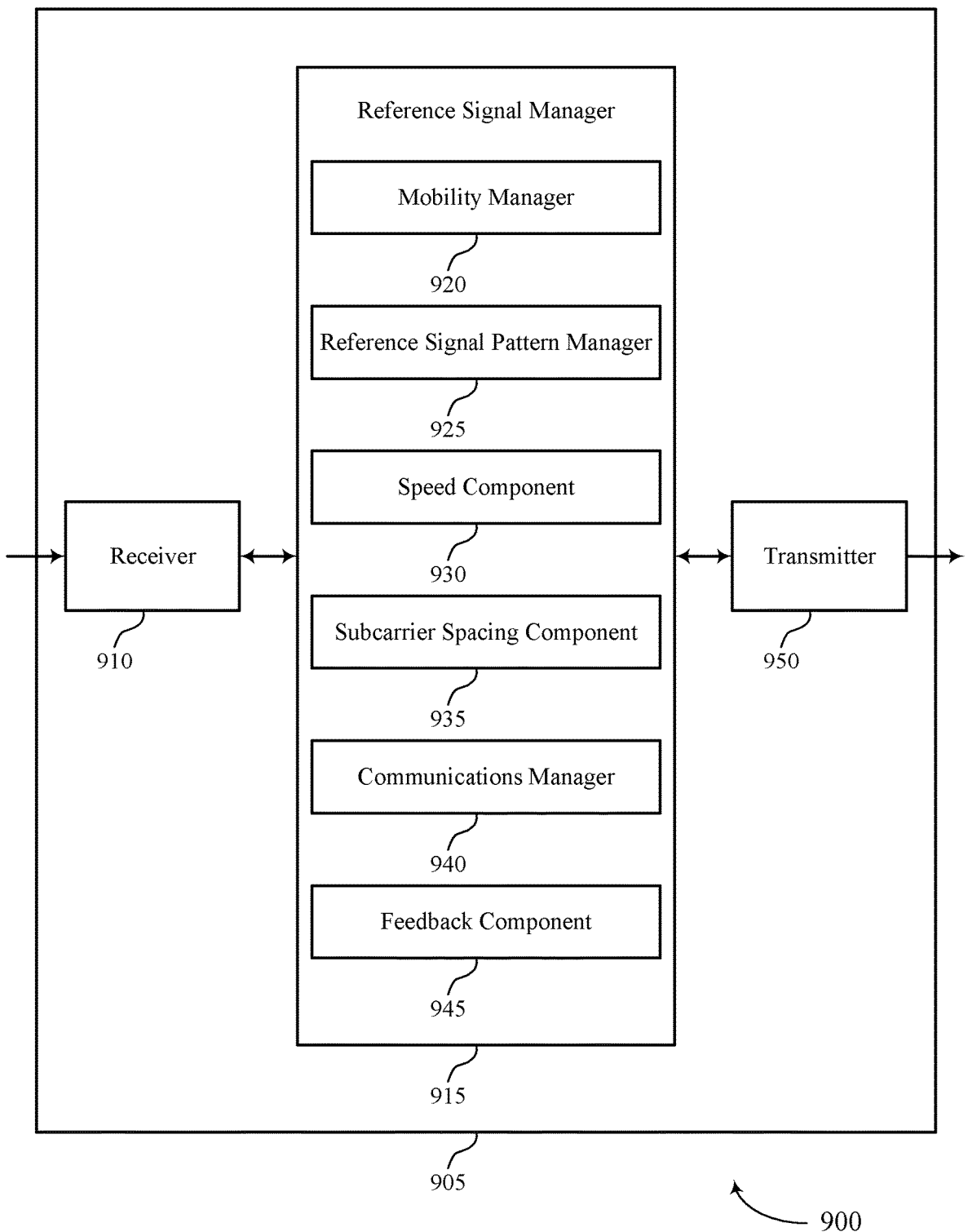

FIG. 9 shows a block diagram 900 of a device 905 that supports reference signal patterns based on relative speed between a transmitter and receiver in accordance with one or more aspects of the present disclosure. The device 905 may be an example of aspects of a device 805, or a UE 115 as described herein. The device 905 may include a receiver 910, a reference signal manager 915, and a transmitter 950. The device 905 may also include a processor. Each of these components may be in communication with one another (e.g., via one or more buses).

The receiver 910 may receive information such as packets, user data, or control information associated with various information channels (e.g., control channels, data channels, and information related to reference signal patterns based on relative speed between a transmitter and receiver, etc.). Information may be passed on to other components of the device 905. The receiver 910 may be an example of aspects of the transceiver 1120 described with reference to FIG. 11. The receiver 910 may utilize a single antenna or a set of antennas.

The reference signal manager 915 may be an example of aspects of the reference signal manager 815 as described herein. The reference signal manager 915 may include a mobility manager 920, a reference signal pattern manager 925, a speed component 930, a subcarrier spacing component 935, a communications manager 940, and a feedback component 945. The reference signal manager 915 may be an example of aspects of the reference signal manager 1110 described herein.

The mobility manager 920 may transmit assistance information to a second wireless device, the assistance information associated with a speed of the first wireless device, or a location of the first wireless device, or a combination thereof.

The reference signal pattern manager 925 may determine an adaptive reference signal pattern of a reference signal for demodulating data, the adaptive reference signal pattern based on the assistance information. The speed component 930 may determine a speed of the first wireless device. The subcarrier spacing component 935 may identify a subcarrier spacing for communicating with one or more other wireless devices.

The reference signal pattern manager 925 may determine, based on the speed of the first wireless device and the subcarrier spacing, a reference signal pattern of a reference signal for demodulating data. The communications manager 940 may transmit the data and the reference signal to the one or more other wireless devices, the reference signal being transmitted in accordance with the reference signal pattern.

The mobility manager 920 may transmit assistance information to a base station, the assistance information associated with a speed of the first wireless device, or a location of the first wireless device, or a combination thereof. The reference signal pattern manager 925 may receive, from the base station, an indication of a reference signal pattern of a reference signal for demodulating data, the reference signal pattern being based on the assistance information.

The communications manager 940 may transmit the data and the reference signal to a second wireless device, the reference signal being transmitted in accordance with the reference signal pattern. The feedback component 945 may receive, from one or more other wireless devices, feedback information in response to one or more previous data transmissions to the one or more other wireless devices.

The reference signal pattern manager 925 may determine a reference signal pattern of a reference signal for demodulating data, the reference signal pattern being based on the feedback information. The communications manager 940 may transmit the data and the reference signal to the one or more other wireless devices, the reference signal being transmitted in accordance with the reference signal pattern.

The transmitter 950 may transmit signals generated by other components of the device 905. In some examples, the transmitter 950 may be collocated with a receiver 910 in a transceiver module. For example, the transmitter 950 may be an example of aspects of the transceiver 1120 described with reference to FIG. 11. The transmitter 950 may utilize a single antenna or a set of antennas.

Figure 10:
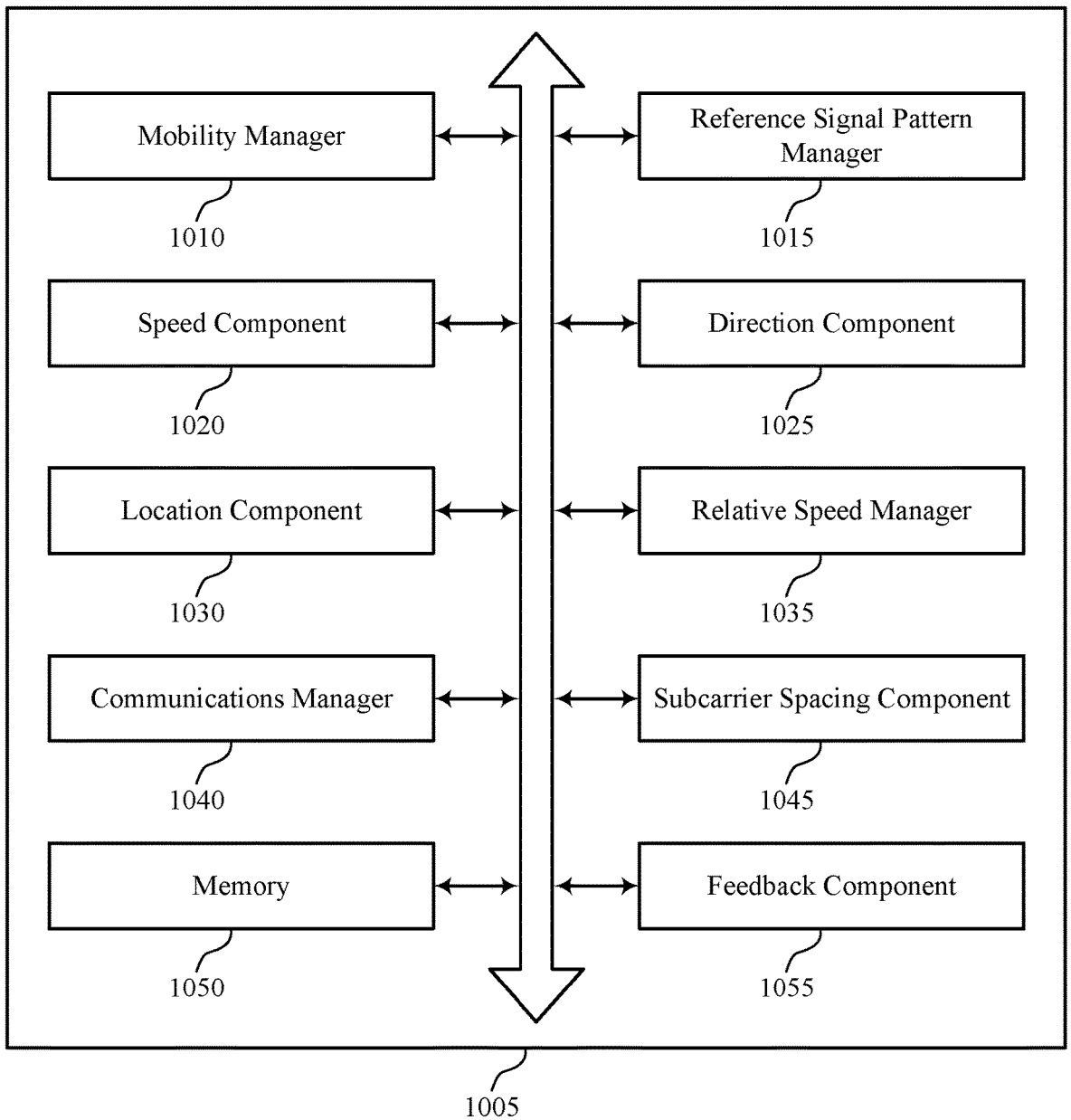
FIG. 10 shows a block diagram of a reference signal manager that supports reference signal patterns based on relative speed between a transmitter and receiver in accordance with one or more aspects of the present disclosure.

FIG. 10 shows a block diagram 1000 of a reference signal manager 1005 that supports reference signal patterns based on relative speed between a transmitter and receiver in accordance with one or more aspects of the present disclosure. The reference signal manager 1005 may be an example of aspects of a reference signal manager 815, a reference signal manager 915, or a reference signal manager 1110 described herein. The reference signal manager 1005 may include a mobility manager 1010, a reference signal pattern manager 1015, a speed component 1020, a direction component 1025, a location component 1030, a relative speed manager 1035, a communications manager 1040, a subcarrier spacing component 1045, memory 1050, and a feedback component 1055. Each of these modules may communicate, directly or indirectly, with one another (e.g., via one or more buses).

The mobility manager 1010 may transmit assistance information to a second wireless device, the assistance information associated with a speed of the first wireless device, or a location of the first wireless device, or a combination thereof.

In some examples, the mobility manager 1010 may transmit assistance information to a base station, the assistance information associated with a speed of the first wireless device, or a location of the first wireless device, or a combination thereof. In some examples, the mobility manager 1010 may transmit, as part of the assistance information, a speed value indicating the speed of the first wireless device. In some examples, the mobility manager 1010 may transmit, as part of the assistance information, a direction value indicating the movement direction of the first wireless device.

In some examples, the mobility manager 1010 may transmit, as part of the assistance information, a location value indicating the location of the first wireless device. In some examples, the mobility manager 1010 may determine a velocity of the first wireless device. In some examples, the mobility manager 1010 may transmit, as part of the assistance information, an indication of the relative speed.

In some examples, the mobility manager 1010 may transmit, as part of the assistance information, an indication of the reference signal pattern. In some examples, the mobility manager 1010 may identify a highest relative speed from the relative speeds of the set of communication links, where the reference signal pattern is based on the highest relative speed.

In some examples, the mobility manager 1010 may receive first assistance information and second assistance information from the second wireless device, each of the first assistance information and the second assistance information being associated with a respective speed of the second wireless device, or a respective location of the second wireless device, or a combination thereof. In some examples, the mobility manager 1010 may identify a periodicity for transmitting the assistance information, where the assistance information is transmitted in accordance with the periodicity.

In some examples, the mobility manager 1010 may generate first assistance information and second assistance information for the first wireless device, each of the first assistance information and the second assistance information being associated with a respective speed of the first wireless device, or a respective location of the first wireless device, or a combination thereof.

In some examples, the mobility manager 1010 may identify a difference between the first assistance information and the second assistance information. In some examples, the mobility manager 1010 may transmit the assistance information based on identifying the difference. In some examples, the mobility manager 1010 may receive a request to transmit the assistance information, where the assistance information is transmitted in response to the received request.

In some examples, the mobility manager 1010 may transmit the assistance information as part of sidelink control information, or as part of a medium access control (MAC)

control element, or over a sidelink data channel, or over a sidelink shared channel, or over a feedback channel, or a combination thereof. The reference signal pattern manager 1015 may identify a reference signal pattern of a reference signal for demodulating data, the reference signal pattern based on the assistance information.

In some examples, the reference signal pattern manager 1015 may determine, based on the speed of the first wireless device and the subcarrier spacing, a reference signal pattern of a reference signal for demodulating data. In some examples, the reference signal pattern manager 1015 may receive, from the base station, an indication of a reference signal pattern of a reference signal for demodulating data, the reference signal pattern being based on the assistance information.

In some examples, the reference signal pattern manager 1015 may determine a reference signal pattern of a reference signal for demodulating data, the reference signal pattern being based on the feedback information. In some examples, the reference signal pattern manager 1015 may determine the reference signal pattern based on the relative speed.

In some examples, the reference signal pattern manager 1015 may receive, from the second wireless device, an indication of the reference signal pattern. In some examples, the reference signal pattern manager 1015 may determine the reference signal pattern based on the indication. In some examples, the reference signal pattern manager 1015 may receive, from a set of wireless devices, respective indications of one or more reference signal patterns.

In some examples, the reference signal pattern manager 1015 may determine the reference signal pattern based on the one or more reference signal patterns. In some examples, the reference signal pattern manager 1015 may select the reference signal pattern from one or more reference signal patterns, each of the one or more reference signal patterns corresponding to a respective relative speed, or a range of relative speeds, or a combination thereof.

In some examples, the reference signal pattern manager 1015 may identify a configuration of a map between the each of the one or more reference signal patterns and the respective relative speed, or the range of relative speeds, or a combination thereof. In some examples, the reference signal pattern manager 1015 may determine the reference signal pattern based on the relative speeds of the set of communication links. In some examples, the reference signal pattern manager 1015 may determine the reference signal pattern based on the subcarrier spacing and a relative speed between the first wireless device and the second wireless device.

In some examples, the reference signal pattern manager 1015 may identify a difference between the first assistance information and the second assistance information. In some examples, the reference signal pattern manager 1015 may determine the reference signal pattern based on the difference. In some examples, the reference signal pattern manager 1015 may transmit an indication of the reference signal pattern to the one or more other wireless devices.

In some examples, the reference signal pattern manager 1015 may determine the reference signal pattern based on the error rate satisfying an error rate threshold. In some examples, the reference signal pattern manager 1015 may determine the reference signal pattern based on the received power satisfying a power threshold. In some cases, the reference signal pattern is based on a map between the one or more reference signal patterns and a respective relative speed, or a range of relative speeds, or a combination thereof, and where the reference signal pattern is determined based on the map and the subcarrier spacing.

In some cases, the reference signal pattern indicates one or more symbol periods during which the reference signal is transmitted and a gap between each of the one or more symbol periods. In some cases, the reference signal pattern is from a set of reference signal patterns, each reference signal pattern of the set including a different number of symbol periods within a slot that include the reference signal.

In some cases, the reference signal pattern is from a set of reference signal patterns, each reference signal pattern of the set including a different gap between symbol periods within a slot that include the reference signal. In some cases, the indication is transmitted within control information to the one or more other wireless devices.

In some cases, the reference signal pattern is from one or more reference signal patterns, each of the one or more reference signal patterns corresponding to a respective speed, or a range of speeds, or a combination thereof. In some cases, the reference signal pattern includes one or more symbol periods during which the reference signal is transmitted and a gap between each of the one or more symbol periods.

The speed component 1020 may determine a speed of the first wireless device. In some examples, the speed component 1020 may determine the speed of the first wireless device. In some examples, the speed component 1020 may determine an absolute speed of the first wireless device. In some examples, the speed component 1020 may identify the speed value from a speed index based on the absolute speed, the speed index including a map between respective speed values and one or more absolute speeds, or a range of absolute speeds, or a combination thereof.

In some examples, the speed component 1020 may identify a configuration of the speed index, where identifying the speed value is based on the configuration. In some examples, the speed component 1020 may receive an indication of the configuration of the speed index. In some examples, the speed component 1020 may receive, from the second wireless device, an indication of a speed of the second wireless device, or a velocity of the second wireless device, or a location of the second wireless device, or a combination thereof.

In some examples, the speed component 1020 may calculate the speed of the second wireless device based on the one or more zones the second wireless device was located in during the time period. In some cases, the speed index is from a set of speed indices. The communications manager 1040 may transmit the data and the reference signal to the one or more other wireless devices, the reference signal being transmitted in accordance with the reference signal pattern.

In some examples, the communications manager 1040 may transmit the data and the reference signal to a second wireless device, the reference signal being transmitted in accordance with the reference signal pattern. In some examples, the communications manager 1040 may transmit the data and the reference signal to the one or more other wireless devices, the reference signal being transmitted in accordance with the reference signal pattern.

In some examples, the communications manager 1040 may identify a set of communication links with other wireless devices, each communication link of the set of communication links being associated with a relative speed between the first wireless device and a respective wireless device. In some examples, the communications manager 1040 may determine an error rate threshold for transmitting the data over the set of communication links, where the reference signal pattern is based on the relative speeds of the set of communication links and the error rate threshold.

In some examples, the communications manager 1040 may transmit the data and the reference signal to the second wireless device, the reference signal being transmitted in accordance with the reference signal pattern. In some examples, the communications manager 1040 may receive the data and the reference signal from the second wireless device, the reference signal being received in accordance with the reference signal pattern.

In some examples, communicating with the second wireless device using sidelink communications, where the first wireless device includes a first UE and the second wireless device includes a second UE. In some examples, the communications manager 1040 may broadcast the data and the reference signal to the one or more other wireless devices.

In some examples, operating under a mode for sidelink communications, where the first wireless device includes a first UE and the second wireless device includes a second UE.

The subcarrier spacing component 1045 may identify a subcarrier spacing for communicating with one or more other wireless devices. In some examples, the subcarrier spacing component 1045 may identify a subcarrier spacing for communicating with the second wireless device.

The feedback component 1055 may receive, from one or more other wireless devices, feedback information in response to one or more previous data transmissions to the one or more other wireless devices. In some examples, the feedback component 1055 may compute an error rate over a time period based on the feedback information. In some examples, the feedback component 1055 may measure a received power of the feedback information.

In some cases, the error rate includes a block error rate or a packet error rate of the one or more previous data transmissions. In some cases, the feedback information includes one or more negative acknowledgments received during a time period. The direction component 1025 may determine a movement direction of the first wireless device.

In some examples, the direction component 1025 may determine an absolute movement direction of the first wireless device. In some examples, the direction component 1025 may identify the direction value from a direction index based on the absolute movement direction, the direction index including a map between one or more absolute movement directions and respective direction values.

In some cases, each of the respective direction values are based on an angular offset from a cardinal direction or an intercardinal direction. The location component 1030 may determine the location of the first wireless device. In some examples, identifying a zone identifier from a set of zone identifiers based on the location of the first wireless device, each of the set of zone identifiers being associated with a respective geographic area, where the location value includes the zone identifier.

In some examples, determining, based on the location of the second wireless device, one or more zones the second wireless device was located in during a time period, where the received indication includes one or more zone identifiers corresponding to respective zones.

The relative speed manager 1035 may identify a relative speed between the first wireless device and the second wireless device based on the assistance information, where the reference signal pattern is determined based on the relative speed.

In some examples, the relative speed manager 1035 may determine the relative speed based on the received indication. In some examples, the relative speed manager 1035 may calculate the relative speed based on the speed of the first wireless device and the speed of the second wireless device. In some examples, the relative speed manager 1035 may calculate the relative speed based on the velocity of the first wireless device and the velocity of the second wireless device. The memory 1050 may store the first assistance information and the second assistance information at the first wireless device.

Figure 11:
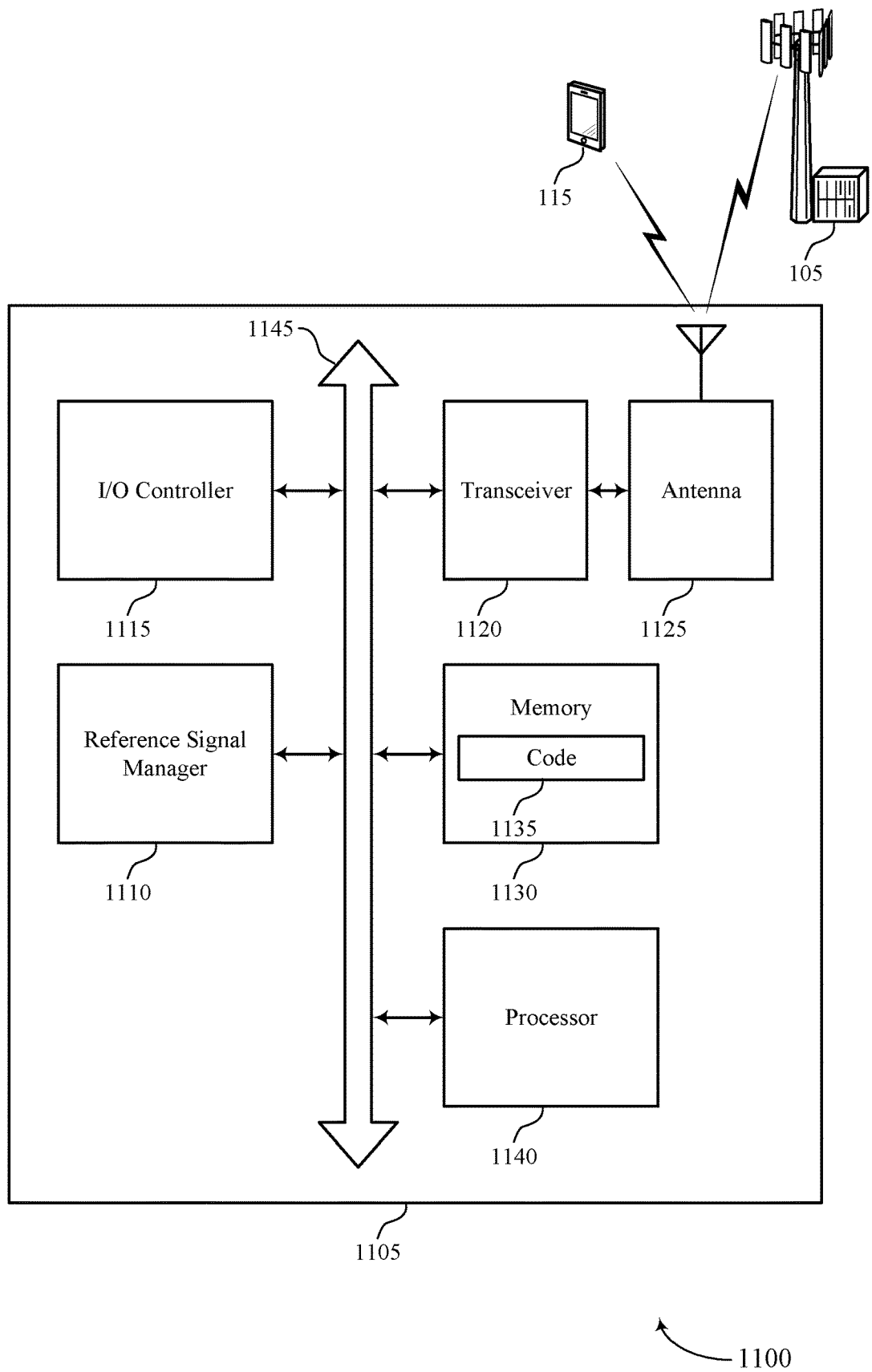
FIG. 11 shows a diagram of a system including a device that supports reference signal patterns based on relative speed between a transmitter and receiver in accordance with one or more aspects of the present disclosure.

FIG. 11 shows a diagram of a system 1100 including a device 1105 that supports reference signal patterns based on relative speed between a transmitter and receiver in accordance with one or more aspects of the present disclosure. The device 1105 may be an example of or include the components of device 805, device 905, or a UE 115 as described herein. The device 1105 may include components for bi-directional voice and data communications including components for transmitting and receiving communications, including a reference signal manager 1110, an I/O controller 1115, a transceiver 1120, an antenna 1125, memory 1130, and a processor 1140. These components may be in electronic communication via one or more buses (e.g., bus 1145).

The reference signal manager 1110 may transmit assistance information to a second wireless device, the assistance information associated with a speed of the first wireless device, or a location of the first wireless device, or a combination thereof and identify a reference signal pattern of a reference signal for demodulating data, the reference signal pattern based on the assistance information. The reference signal manager 1110 may also determine a speed of the first wireless device, identify a subcarrier spacing for communicating with one or more other wireless devices, determine, based on the speed of the first wireless device and the subcarrier spacing, a reference signal pattern of a reference signal for demodulating data, and transmit the data and the reference signal to the one or more other wireless devices, the reference signal being transmitted in accordance with the reference signal pattern. The reference signal manager 1110 may also transmit assistance information to a base station, the assistance information associated with a speed of the first wireless device, or a location of the first wireless device, or a combination thereof, receive, from the base station, an indication of a reference signal pattern of a reference signal for demodulating data, the reference signal pattern being based on the assistance information, and transmit the data and the reference signal to a second wireless device, the reference signal being transmitted in accordance with the reference signal pattern. The reference signal manager 1110 may also receive, from one or more other wireless devices, feedback information in response to one or more previous data transmissions to the one or more other wireless devices, determine a reference signal pattern of a reference signal for demodulating data, the reference signal pattern being based on the feedback information, and transmit the data and the reference signal to the one or more other wireless devices, the reference signal being transmitted in accordance with the reference signal pattern.

The I/O controller 1115 may manage input and output signals for the device 1105. The I/O controller 1115 may also manage peripherals not integrated into the device 1105. In some cases, the I/O controller 1115 may represent a physical connection or port to an external peripheral. In some cases, the I/O controller 1115 may utilize an operating system such as iOS®, ANDROID®, MS-DOS®, MS-WINDOWS®, OS/2®, UNIX®, LINUX®, or another known operating system. In other cases, the I/O controller 1115 may represent or interact with a modem, a keyboard, a mouse, a touchscreen, or a similar device. In some cases, the I/O controller 1115 may be implemented as part of a processor. In some cases, a user may interact with the device 1105 via the I/O controller 1115 or via hardware components controlled by the I/O controller 1115.

The transceiver 1120 may communicate bi-directionally, via one or more antennas, wired, or wireless links as described herein. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases, the device may have more than one antenna 1125, which may be capable of concurrently transmitting or receiving multiple wireless transmissions.

The memory 1130 may include random-access memory (RAM) and read-only memory (ROM). The memory 1130 may store computer-readable, computer-executable code 1135 including instructions that, when executed, cause the processor to perform various functions described herein. In some cases, the memory 1130 may contain, among other things, a basic input/output system (BIOS) which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting reference signal patterns based on relative speed between a transmitter and receiver).

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
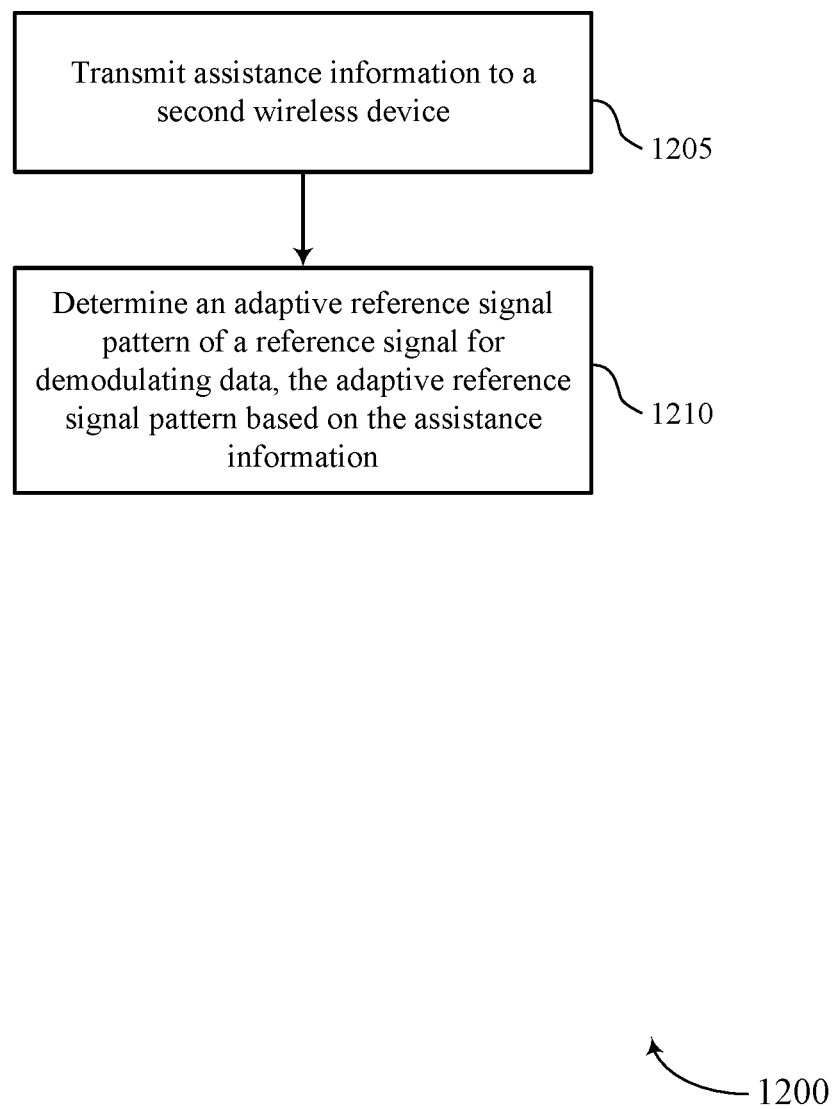
FIGS. 12 through 18 show flowcharts illustrating methods that support reference signal patterns based on relative speed between a transmitter and receiver in accordance with one or more aspects of the present disclosure.

FIG. 12 shows a flowchart illustrating a method 1200 that supports reference signal patterns based on relative speed between a transmitter and receiver in accordance with one or more aspects of the present disclosure. The operations of method 1200 may be implemented by a UE 115 or its components as described herein. For example, the operations of method 1200 may be performed by a reference signal manager as described with reference to FIGS. 8 through 11. In some examples, a UE may execute a set of instructions to control the functional elements of the UE to perform the functions described herein. Additionally or alternatively, a UE may perform aspects of the functions described herein using special-purpose hardware.

At 1205, the UE may transmit assistance information to a second wireless device. For example, the assistance information may be associated with a speed of the first wireless device, or a location of the first wireless device, or a combination thereof. The operations of 1205 may be performed according to the methods described herein. In some examples, aspects of the operations of 1205 may be performed by a mobility manager as described with reference to FIGS. 8 through 11.

At 1210, the UE may determine an adaptive reference signal pattern of a reference signal for demodulating data, the adaptive reference signal pattern based on the assistance information. The operations of 1210 may be performed according to the methods described herein. In some examples, aspects of the operations of 1210 may be performed by a reference signal pattern manager as described with reference to FIGS. 8 through 11.

Figure 13:
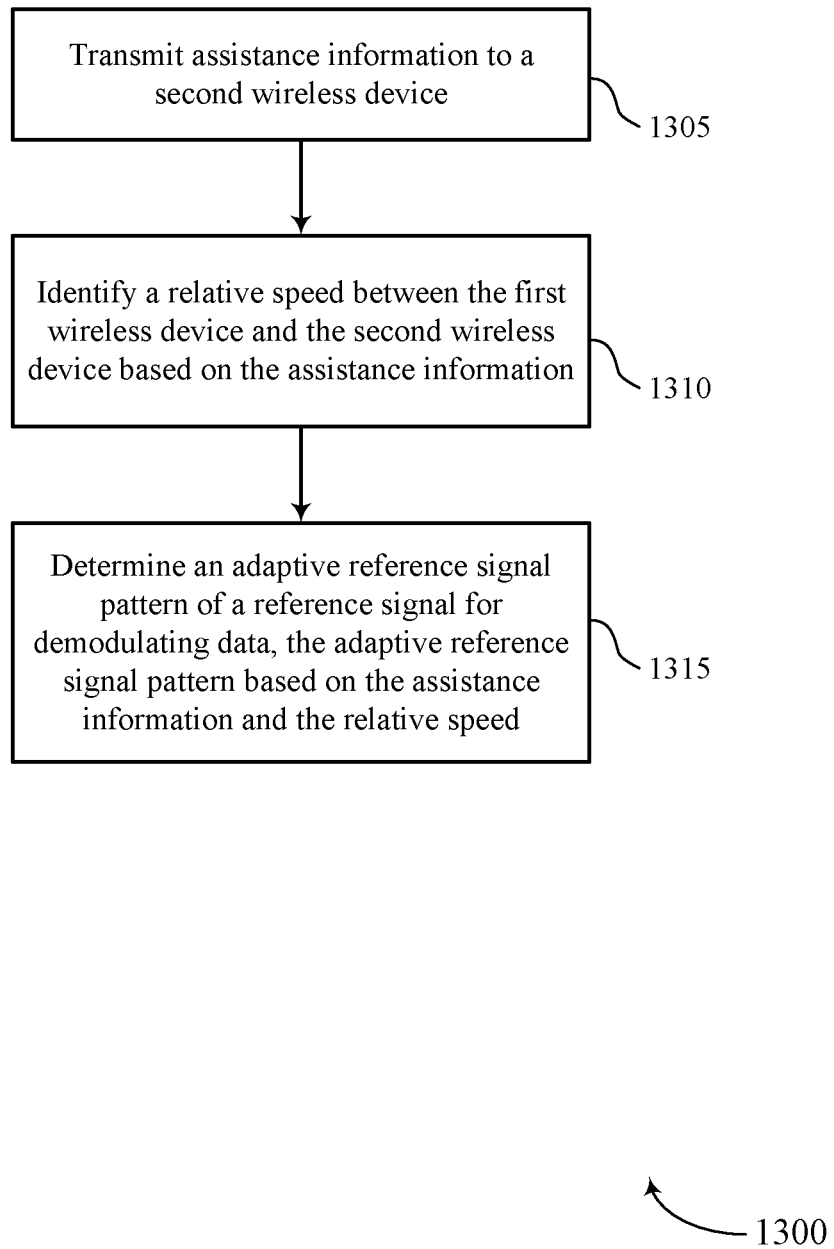

FIG. 13 shows a flowchart illustrating a method 1300 that supports reference signal patterns based on relative speed between a transmitter and receiver in accordance with one or more aspects of the present disclosure. The operations of method 1300 may be implemented by a UE 115 or its components as described herein. For example, the operations of method 1300 may be performed by a reference signal manager as described with reference to FIGS. 8 through 11. In some examples, a UE may execute a set of instructions to control the functional elements of the UE to perform the functions described herein. Additionally or alternatively, a UE may perform aspects of the functions described herein using special-purpose hardware.

At 1305, the UE may transmit assistance information to a second wireless device. For example, the assistance information may be associated with a speed of the first wireless device (e.g., the UE), or a location of the first wireless device, or a combination thereof. The operations of 1305 may be performed according to the methods described herein. In some examples, aspects of the operations of 1305 may be performed by a mobility manager as described with reference to FIGS. 8 through 11.

At 1310, the UE may identify a relative speed between the first wireless device and the second wireless device based on the assistance information. The operations of 1310 may be performed according to the methods described herein. In some examples, aspects of the operations of 1310 may be performed by a relative speed manager as described with reference to FIGS. 8 through 11.

At 1315, the UE may determine an adaptive reference signal pattern of a reference signal for demodulating data, the adaptive reference signal pattern based on the assistance information and the relative speed. The operations of 1315 may be performed according to the methods described herein. In some examples, aspects of the operations of 1315 may be performed by a reference signal pattern manager as described with reference to FIGS. 8 through 11.

Figure 14:
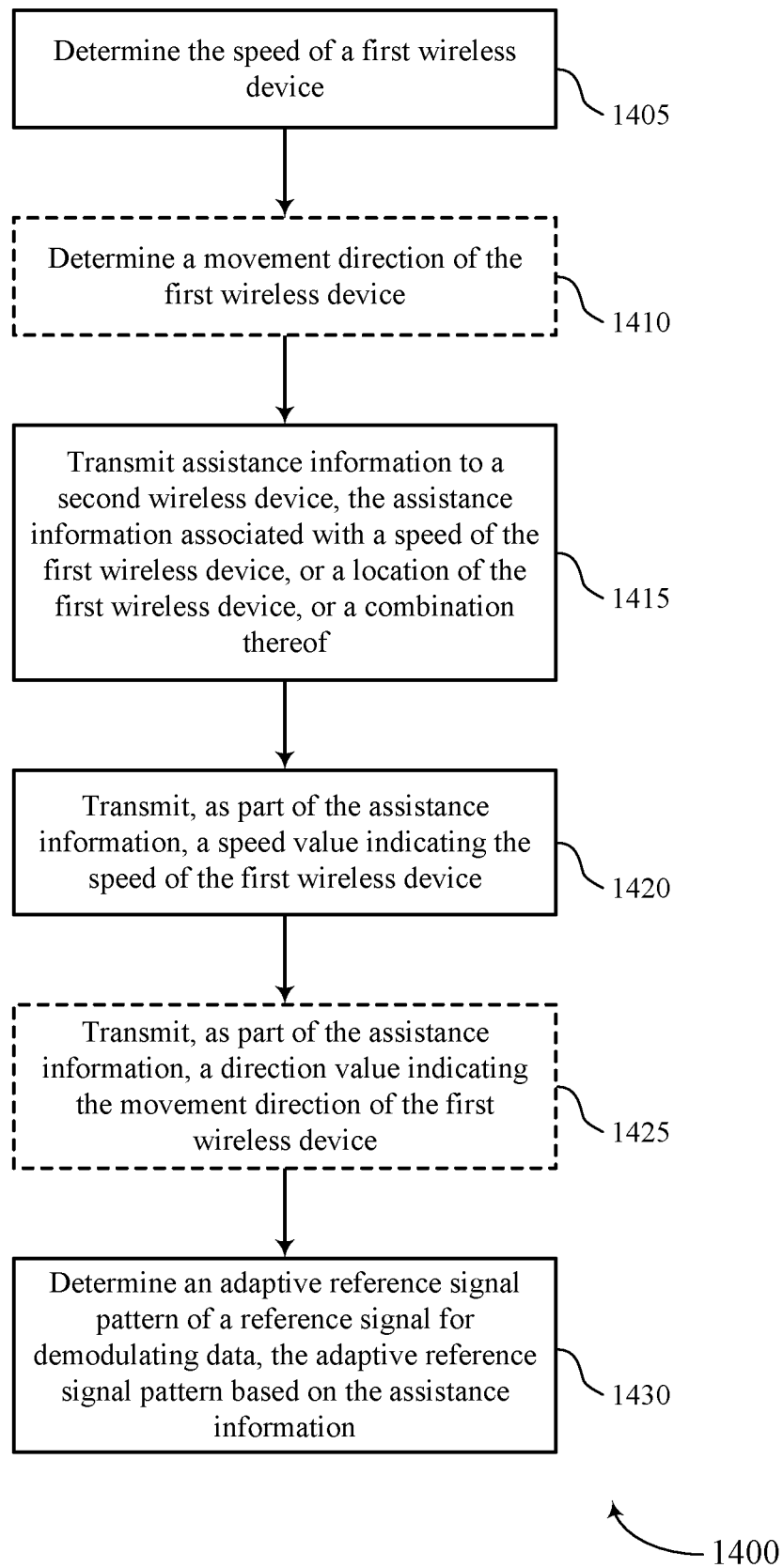

FIG. 14 shows a flowchart illustrating a method 1400 that supports reference signal patterns based on relative speed between a transmitter and receiver in accordance with one or more aspects of the present disclosure. The operations of method 1400 may be implemented by a UE 115 or its components as described herein. For example, the operations of method 1400 may be performed by a reference signal manager as described with reference to FIGS. 8 through 11. In some examples, a UE may execute a set of instructions to control the functional elements of the UE to perform the functions described herein. Additionally or alternatively, a UE may perform aspects of the functions described herein using special-purpose hardware.

At 1405, the UE may determine the speed of a first wireless device (e.g., the UE). The operations of 1405 may be performed according to the methods described herein. In some examples, aspects of the operations of 1405 may be performed by a speed component as described with reference to FIGS. 8 through 11.

At 1410, the UE may determine a movement direction of the first wireless device. The operations of 1410 may be performed according to the methods described herein. In some examples, aspects of the operations of 1410 may be performed by a direction component as described with reference to FIGS. 8 through 11.

At 1415, the UE may transmit assistance information to a second wireless device (e.g., another UE), the assistance information associated with a speed of the first wireless device, or a location of the first wireless device, or a combination thereof. The operations of 1415 may be performed according to the methods described herein. In some examples, aspects of the operations of 1415 may be performed by a mobility manager as described with reference to FIGS. 8 through 11.

At 1420, the UE may transmit, as part of the assistance information, a speed value indicating the speed of the first wireless device. The operations of 1420 may be performed according to the methods described herein. In some examples, aspects of the operations of 1420 may be performed by a mobility manager as described with reference to FIGS. 8 through 11.

At 1425, the UE may also transmit, as part of the assistance information, a direction value indicating the movement direction of the first wireless device. That is, the UE may options transmit speed information, or both speed and movement direction information within the assistance information. The operations of 1425 may be performed according to the methods described herein. In some examples, aspects of the operations of 1425 may be performed by a mobility manager as described with reference to FIGS. 8 through 11.

At 1430, the UE may determine an adaptive reference signal pattern of a reference signal for demodulating data, the adaptive reference signal pattern based on the assistance information. The operations of 1430 may be performed according to the methods described herein. In some examples, aspects of the operations of 1430 may be performed by a reference signal pattern manager as described with reference to FIGS. 8 through 11.

Figure 15:
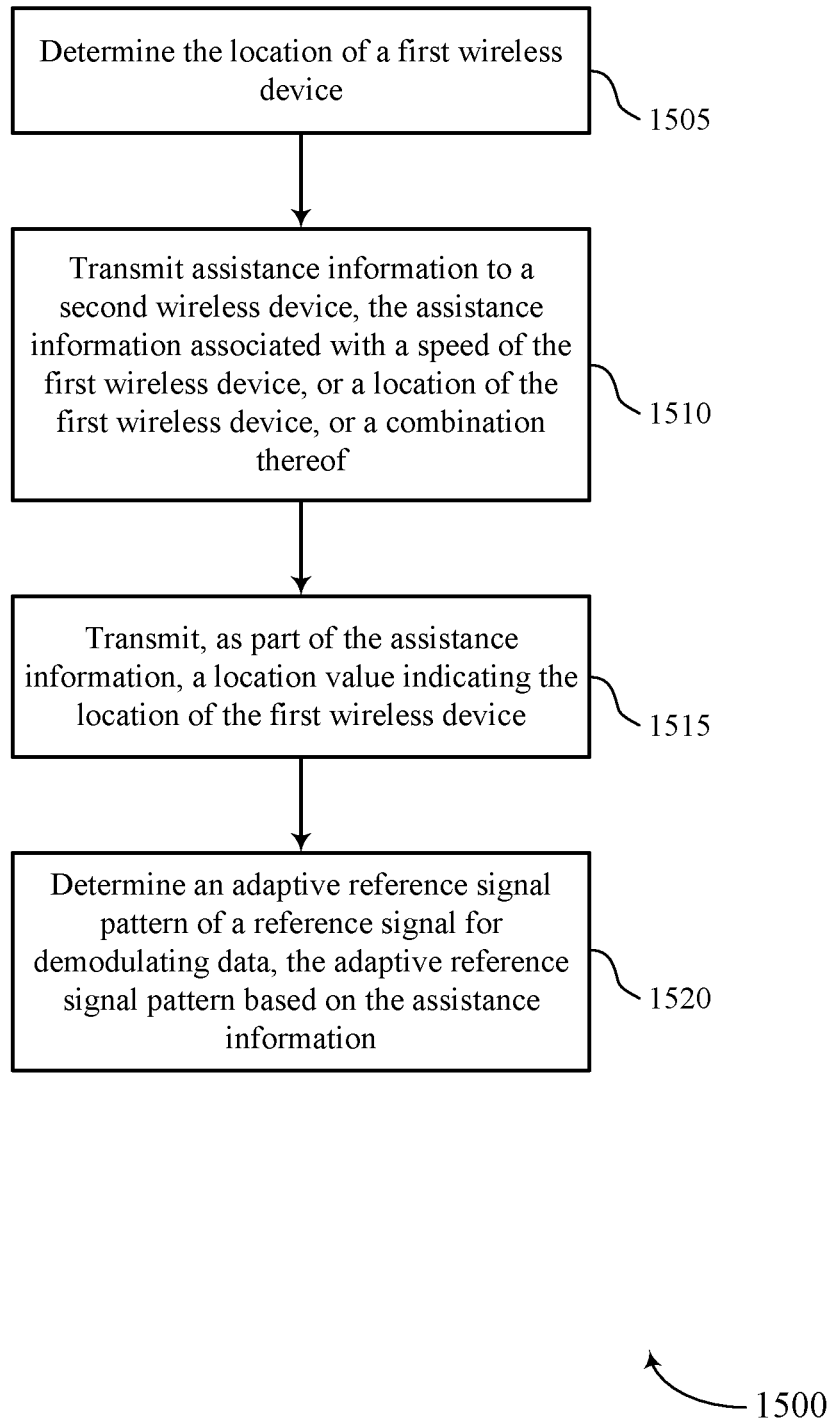

FIG. 15 shows a flowchart illustrating a method 1500 that supports reference signal patterns based on relative speed between a transmitter and receiver in accordance with one or more aspects of the present disclosure. The operations of method 1500 may be implemented by a UE 115 or its components as described herein. For example, the operations of method 1500 may be performed by a reference signal manager as described with reference to FIGS. 8 through 11. In some examples, a UE may execute a set of instructions to control the functional elements of the UE to perform the functions described herein. Additionally or alternatively, a UE may perform aspects of the functions described herein using special-purpose hardware.

At 1505, the UE may determine the location of a first wireless device (e.g., the UE). The operations of 1505 may be performed according to the methods described herein. In some examples, aspects of the operations of 1505 may be performed by a location component as described with reference to FIGS. 8 through 11.

At 1510, the UE may transmit assistance information to a second wireless device, the assistance information associated with a speed of the first wireless device, or a location of the first wireless device, or a combination thereof. The operations of 1510 may be performed according to the methods described herein. In some examples, aspects of the operations of 1510 may be performed by a mobility manager as described with reference to FIGS. 8 through 11.

At 1515, the UE may transmit, as part of the assistance information, a location value indicating the location of the first wireless device. The operations of 1515 may be performed according to the methods described herein. In some examples, aspects of the operations of 1515 may be performed by a mobility manager as described with reference to FIGS. 8 through 11.

At 1520, the UE may determine an adaptive reference signal pattern of a reference signal for demodulating data, the adaptive reference signal pattern based on the assistance information. The operations of 1520 may be performed according to the methods described herein. In some examples, aspects of the operations of 1520 may be performed by a reference signal pattern manager as described with reference to FIGS. 8 through 11.

Figure 16:
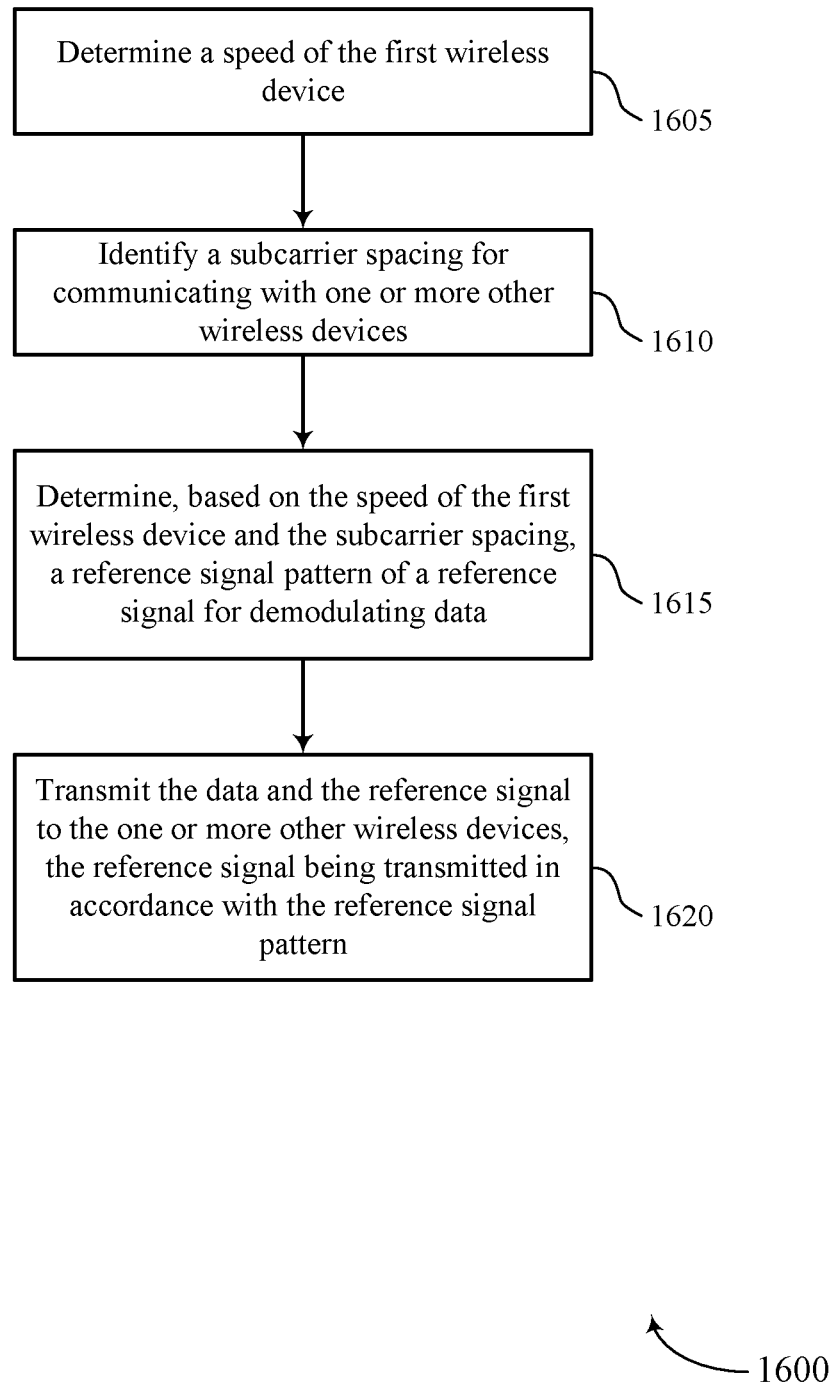

FIG. 16 shows a flowchart illustrating a method 1600 that supports reference signal patterns based on relative speed between a transmitter and receiver in accordance with one or more aspects of the present disclosure. The operations of method 1600 may be implemented by a UE 115 or its components as described herein. For example, the operations of method 1600 may be performed by a reference signal manager as described with reference to FIGS. 8 through 11. In some examples, a UE may execute a set of instructions to control the functional elements of the UE to perform the functions described herein. Additionally or alternatively, a UE may perform aspects of the functions described herein using special-purpose hardware.

At 1605, the UE may determine a speed of the first wireless device (e.g., the UE). The operations of 1605 may be performed according to the methods described herein. In some examples, aspects of the operations of 1605 may be performed by a speed component as described with reference to FIGS. 8 through 11.

At 1610, the UE may identify a subcarrier spacing for communicating with one or more other wireless devices. The operations of 1610 may be performed according to the methods described herein. In some examples, aspects of the operations of 1610 may be performed by a subcarrier spacing component as described with reference to FIGS. 8 through 11.

At 1615, the UE may determine, based on the speed of the first wireless device and the subcarrier spacing, a reference signal pattern of a reference signal for demodulating data. The operations of 1615 may be performed according to the methods described herein. In some examples, aspects of the operations of 1615 may be performed by a reference signal pattern manager as described with reference to FIGS. 8 through 11.

At 1620, the UE may transmit the data and the reference signal to the one or more other wireless devices, the reference signal being transmitted in accordance with the reference signal pattern. The operations of 1620 may be performed according to the methods described herein. In some examples, aspects of the operations of 1620 may be performed by a communications manager as described with reference to FIGS. 8 through 11.

Figure 17:
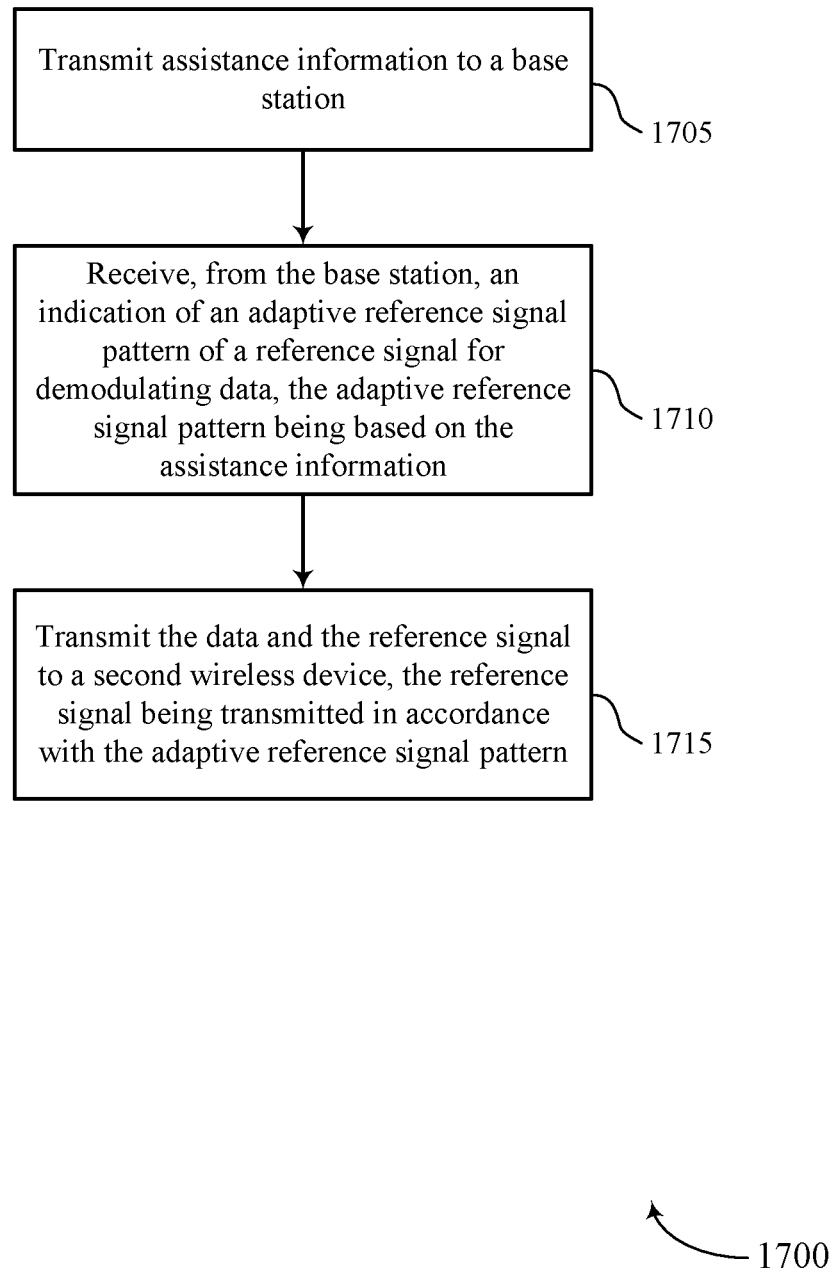

FIG. 17 shows a flowchart illustrating a method 1700 that supports reference signal patterns based on relative speed between a transmitter and receiver in accordance with one or more aspects of the present disclosure. The operations of method 1700 may be implemented by a UE 115 or its components as described herein. For example, the operations of method 1700 may be performed by a reference signal manager as described with reference to FIGS. 8 through 11. In some examples, a UE may execute a set of instructions to control the functional elements of the UE to perform the functions described herein. Additionally or alternatively, a UE may perform aspects of the functions described herein using special-purpose hardware.

At 1705, the UE may transmit assistance information to a base station. For example, the assistance information may be associated with a speed of the first wireless device (e.g., the UE), or a location of the first wireless device, or a combination thereof. The operations of 1705 may be performed according to the methods described herein. In some examples, aspects of the operations of 1705 may be performed by a mobility manager as described with reference to FIGS. 8 through 11.

At 1710, the UE may receive, from the base station, an indication of an adaptive reference signal pattern of a reference signal for demodulating data, the adaptive reference signal pattern being based on the assistance information. The operations of 1710 may be performed according to the methods described herein. In some examples, aspects of the operations of 1710 may be performed by a reference signal pattern manager as described with reference to FIGS. 8 through 11.

At 1715, the UE may transmit the data and the reference signal to a second wireless device, the reference signal being transmitted in accordance with the adaptive reference signal pattern. The operations of 1715 may be performed according to the methods described herein. In some examples, aspects of the operations of 1715 may be performed by a communications manager as described with reference to FIGS. 8 through 11.

Figure 18:
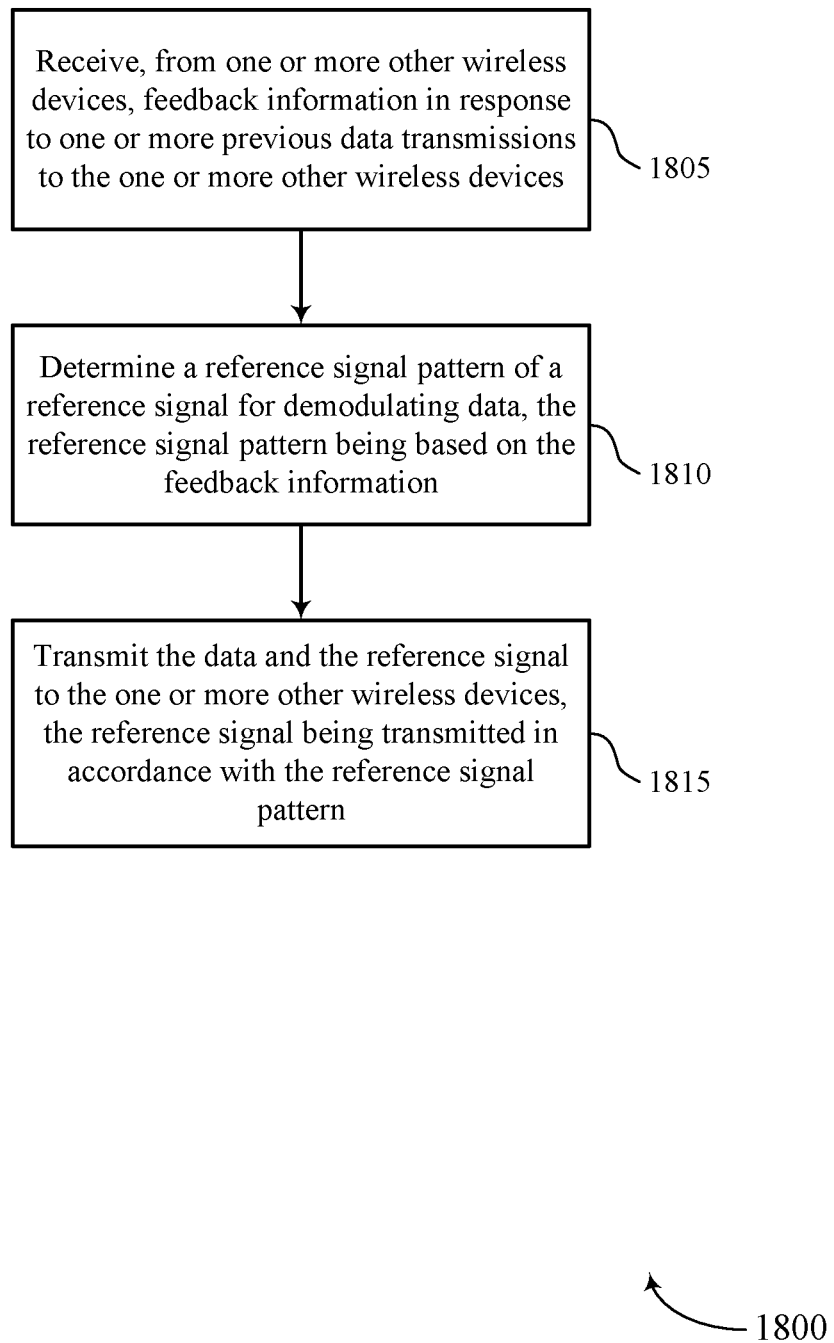

FIG. 18 shows a flowchart illustrating a method 1800 that supports reference signal patterns based on relative speed between a transmitter and receiver in accordance with one or more aspects of the present disclosure. The operations of method 1800 may be implemented by a UE 115 or its components as described herein. For example, the operations of method 1800 may be performed by a reference signal manager as described with reference to FIGS. 8 through 11. In some examples, a UE may execute a set of instructions to control the functional elements of the UE to perform the functions described herein. Additionally or alternatively, a UE may perform aspects of the functions described herein using special-purpose hardware.

At 1805, the UE may receive, from one or more other wireless devices, feedback information in response to one or more previous data transmissions to the one or more other wireless devices. The operations of 1805 may be performed according to the methods described herein. In some examples, aspects of the operations of 1805 may be performed by a feedback component as described with reference to FIGS. 8 through 11.

At 1810, the UE may determine a reference signal pattern of a reference signal for demodulating data, the reference signal pattern being based on the feedback information. The operations of 1810 may be performed according to the methods described herein. In some examples, aspects of the operations of 1810 may be performed by a reference signal pattern manager as described with reference to FIGS. 8 through 11.

At 1815, the UE may transmit the data and the reference signal to the one or more other wireless devices, the reference signal being transmitted in accordance with the reference signal pattern. The operations of 1815 may be performed according to the methods described herein. In some examples, aspects of the operations of 1815 may be performed by a communications manager as described with reference to FIGS. 8 through 11.

The following provides an overview of examples of the present disclosure:

Example 1: A method for wireless communications at a first wireless device comprising: transmitting assistance information to a second wireless device; and determining an adaptive reference signal pattern of a reference signal for demodulating data, the adaptive reference signal pattern based at least in part on the assistance information.

Example 2: The method of example 1, further comprising: determining a speed of the first wireless device; and transmitting, as part of the assistance information, a speed value indicating the speed of the first wireless device.

Example 3: The method of any one of examples 1 and 2, further comprising: determining a movement direction of the first wireless device; and transmitting, as part of the assistance information, a direction value indicating the movement direction of the first wireless device.

Example 4: The method of any one of examples 1 and 2, further comprising: determining an absolute speed of the first wireless device; and identifying the speed value from a speed index based at least in part on the absolute speed, the speed index comprising a map between respective speed values and one or more absolute speeds, or a range of absolute speeds, or a combination thereof.

Example 5: The method of any one of examples 1 through 4, further comprising: determining a location of the first wireless device; and transmitting, as part of the assistance information, a location value indicating the location of the first wireless device.

Example 6: The method of any one of examples 1 through 5, further comprising: identifying a relative speed between the first wireless device and the second wireless device based at least in part on the assistance information, wherein the adaptive reference signal pattern is determined based at least in part on the relative speed.

Example 7: The method of example 1 through 6, wherein identifying the relative speed comprises: receiving, from the second wireless device, an indication of a speed of the second wireless device, or a velocity of the second wireless device, or a location of the second wireless device, or a combination thereof; and determining the relative speed based at least in part on the indication.

Example 8: The method of any one of examples 1 through 7, further comprising: transmitting, as part of the assistance information, an indication of the relative speed.

Example 9: The method of any one of examples 1 through 8, further comprising: determining the adaptive reference signal pattern based at least in part on the relative speed; and transmitting, as part of the assistance information, an indication of the adaptive reference signal pattern.

Example 10: The method of any one of examples 1 through 9, wherein determining the adaptive reference signal pattern comprises: receiving, from the second wireless device, an indication of the adaptive reference signal pattern; and determining the adaptive reference signal pattern based at least in part on the indication.

Example 11: The method of any one of examples 1 through 10, wherein determining the adaptive reference signal pattern comprises: receiving, from a plurality of wireless devices, respective indications of one or more reference signal patterns; and determining the adaptive reference signal pattern based at least in part on the one or more reference signal patterns.

Example 12: The method of any one of examples 1 through 11, wherein determining the adaptive reference signal pattern comprises: selecting the adaptive reference signal pattern from one or more reference signal patterns, each of the one or more reference signal patterns corresponding to a respective relative speed, or a range of relative speeds, or a combination thereof.

Example 13: The method of any one of examples 1 through 12, wherein determining the adaptive reference signal pattern comprises: identifying a plurality of communication links with other wireless devices, each communication link of the plurality of communication links being associated with a relative speed between the first wireless device and a respective wireless device; and determining the adaptive reference signal pattern based at least in part on the relative speeds of the plurality of communication links.

Example 14: The method of any one of examples 1 through 13, wherein determining the adaptive reference signal pattern comprises: identifying a subcarrier spacing for communicating with the second wireless device; and determining the adaptive reference signal pattern based at least in part on the subcarrier spacing and a relative speed between the first wireless device and the second wireless device.

Example 15: The method of any one of examples 1 through 14, further comprising: receiving first assistance information and second assistance information from the second wireless device, each of the first assistance information and the second assistance information being associated with a respective speed of the second wireless device, or a respective location of the second wireless device, or a combination thereof; storing the first assistance information and the second assistance information at the first wireless device; identifying a difference between the first assistance information and the second assistance information; and determining the adaptive reference signal pattern based at least in part on the difference.

Example 16: The method of any one of examples 1 through 15, further comprising: generating first assistance information and second assistance information for the first wireless device, each of the first assistance information and the second assistance information being associated with a respective speed of the first wireless device, or a respective location of the first wireless device, or a combination thereof; identifying a difference between the first assistance information and the second assistance information; and transmitting the assistance information based at least in part on identifying the difference.

Example 17: The method of any one of examples 1 through 16, further comprising: identifying a periodicity for transmitting the assistance information, wherein the assistance information is transmitted in accordance with the periodicity.

Example 18: The method of any one of examples 1 through 17, further comprising: receiving a request to transmit the assistance information, wherein the assistance information is transmitted in response to the request.

Example 19: The method of any one of examples 1 through 18, further comprising: transmitting the data and the reference signal to the second wireless device, the reference signal being transmitted in accordance with the adaptive reference signal pattern, wherein the adaptive reference signal pattern indicates one or more symbol periods during which the reference signal is transmitted and a gap between each of the one or more symbol periods.

Example 20: The method of any one of examples 1 through 19, further comprising: receiving the data and the reference signal from the second wireless device, the reference signal being received in accordance with the adaptive reference signal pattern, wherein the adaptive reference signal pattern indicates one or more symbol periods during which the reference signal is transmitted and a gap between each of the one or more symbol periods.

Example 21: The method of any one of examples 1 through 20, further comprising: communicating with the second wireless device using sidelink communications, wherein the first wireless device comprises a first user equipment (UE) and the second wireless device comprises a second UE.

Example 22: The method of any one of examples 1 through 21, wherein the sidelink communications comprise vehicle to everything communications.

Example 23: A method for wireless communications at a first wireless device, comprising: determining a speed of the first wireless device; identifying a subcarrier spacing for communicating with one or more other wireless devices; determining, based at least in part on the speed of the first wireless device and the subcarrier spacing, a reference signal pattern of a reference signal for demodulating data; and transmitting the data and the reference signal to the one or more other wireless devices, the reference signal being transmitted in accordance with the reference signal pattern.

Example 24: The method of example 23, wherein transmitting the data and indication of the reference signal pattern comprises: broadcasting the data and the reference signal to the one or more other wireless devices.

Example 25: The method of any one of examples 23 and 24, further comprising: transmitting an indication of the reference signal pattern to the one or more other wireless devices.

Example 26: A method for wireless communications at a first wireless device comprising: transmitting assistance information to a base station; receiving, from the base station, an indication of an adaptive reference signal pattern of a reference signal for demodulating data, the adaptive reference signal pattern being based at least in part on the assistance information; and transmitting the data and the reference signal to a second wireless device, the reference signal being transmitted in accordance with the adaptive reference signal pattern.

Example 27: The method of example 26, wherein the adaptive reference signal pattern is from one or more reference signal patterns, each of the one or more reference signal patterns corresponding to a respective speed, or a range of speeds, or a combination thereof.

Example 28: The method of any one of examples 26 and 27, wherein the adaptive reference signal pattern comprises one or more symbol periods during which the reference signal is transmitted and a gap between each of the one or more symbol periods.

Example 29: A method for wireless communications at a first wireless device, comprising: receiving, from one or more other wireless devices, feedback information in response to one or more previous data transmissions to the one or more other wireless devices; determining a reference signal pattern of a reference signal for demodulating data, the reference signal pattern being based at least in part on the feedback information; and transmitting the data and the reference signal to the one or more other wireless devices, the reference signal being transmitted in accordance with the reference signal pattern.

Example 30: The method of example 29, wherein determining the reference signal pattern comprises: computing an error rate over a time period based at least in part on the feedback information; and determining the reference signal pattern based at least in part on the error rate satisfying an error rate threshold.

Example 31: An apparatus for wireless communication comprising at least one means for performing a method of any one of examples 1 through 22.

Example 32: An apparatus for wireless communication comprising a processor, and memory coupled to the processor, and the processor and memory may be configured to cause the apparatus to perform a method of any one of examples 1 through 22.

Example 33: A non-transitory computer-readable medium storing code for wireless communication comprising a processor, memory in electronic communication with the processor, and instructions executable by the processor to cause the apparatus to perform a method of any one of examples 1 through 22.

Example 34: An apparatus for wireless communication comprising at least one means for performing a method of any one of examples 23 through 25.

Example 35: An apparatus for wireless communication comprising a processor, and memory coupled to the processor, and the processor and memory may be configured to cause the apparatus to perform a method of any one of examples 23 through 25.

Example 36: A non-transitory computer-readable medium storing code for wireless communication comprising a processor, memory in electronic communication with the processor, and instructions executable by the processor to cause the apparatus to perform a method of any one of examples 23 through 25.

Example 37: An apparatus for wireless communication comprising at least one means for performing a method of any one of examples 26 through 28.

Example 38: An apparatus for wireless communication comprising a processor, and memory coupled to the processor, and the processor and memory may be configured to cause the apparatus to perform a method of any one of examples 26 through 28.

Example 39: A non-transitory computer-readable medium storing code for wireless communication comprising a processor, memory in electronic communication with the processor, and instructions executable by the processor to cause the apparatus to perform a method of any one of examples 26 through 28.

Example 40: An apparatus for wireless communication comprising at least one means for performing a method of any one of examples 29 and 30.

Example 41: An apparatus for wireless communication comprising a processor, and memory coupled to the processor, and the processor and memory may be configured to cause the apparatus to perform a method of any one of examples 29 and 30.

Example 42: A non-transitory computer-readable medium storing code for wireless communication comprising a processor, memory in electronic communication with the processor, and instructions executable by the processor to cause the apparatus to perform a method of any one of examples 29 and 30.

It should be noted that the methods described herein describe possible implementations, and that the operations may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary feature that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a first wireless device, comprising:
   one or more memories; and
   one or more processors coupled with the one or more memories and configured to cause the first wireless device to:
   determine a speed of the first wireless device;
   identify a subcarrier spacing for communications with one or more other wireless devices;
   determine, based at least in part on the speed of the first wireless device and the subcarrier spacing, a reference signal pattern of a reference signal for demodulation of data;
   transmit an indication of the reference signal pattern to the one or more other wireless devices; and
   transmit the data and the reference signal to the one or more other wireless devices, wherein the reference signal is transmitted in accordance with the reference signal pattern.

2. The apparatus of claim 1, wherein, to transmit the data and the reference signal, the one or more processors are configured to cause the first wireless device to:
   broadcast the data and the reference signal to the one or more other wireless devices.

3. The apparatus of claim 1, wherein the indication of the reference signal pattern is transmitted via a sidelink control information message.

4. The apparatus of claim 1, wherein, to determine the reference signal pattern of the reference signal, the one or more processors are configured to cause the first wireless device to:
  select the reference signal pattern from one or more reference signal patterns, each of the one or more reference signal patterns corresponding to a respective speed, a range of speeds, or a combination thereof.

5. The apparatus of claim 1, wherein the one or more processors are configured to cause the first wireless device to:
  determine a direction of the first wireless device, wherein the reference signal pattern is based at least in part on the direction.

6. The apparatus of claim 1, wherein the one or more processors are configured to cause the first wireless device to:
  determine that the first wireless device is unable to receive assistance information from the one or more other wireless devices, wherein the speed, the subcarrier spacing, the reference signal pattern, or any combination thereof, is determined based on the first wireless device being unable to receive assistance information from the one or more other wireless devices.

7. The apparatus of claim 6, wherein the one or more processors are configured to cause the first wireless device to:
  estimate an additional speed, a direction, or both, of the one or more other wireless devices based at least in part on the first wireless device being unable to receive assistance information from the one or more other wireless devices, wherein the reference signal pattern is based at least in part on the additional speed, the direction, or both.

8. The apparatus of claim 1, wherein the reference signal pattern comprises a demodulation reference signal pattern, and wherein the reference signal comprises a demodulation reference signal.

9. A method for wireless communications at a first wireless device, comprising:
  determining a speed of the first wireless device;
  identifying a subcarrier spacing for communications with one or more other wireless devices;
  determining, based at least in part on the speed of the first wireless device and the subcarrier spacing, a reference signal pattern of a reference signal for demodulating data;
  transmitting an indication of the reference signal pattern to the one or more other wireless devices; and
  transmitting the data and the reference signal to the one or more other wireless devices, wherein the reference signal is transmitted in accordance with the reference signal pattern.

10. The method of claim 9, wherein transmitting the data and the reference signal comprises:
  broadcasting the data and the reference signal to the one or more other wireless devices.

11. The method of claim 9, wherein the indication of the reference signal pattern is transmitted via a sidelink control information message.

12. The method of claim 9, wherein determining the reference signal pattern of the reference signal comprises:
  selecting the reference signal pattern from one or more reference signal patterns, each of the one or more reference signal patterns corresponding to a respective speed, a range of speeds, or a combination thereof.

13. The method of claim 9, further comprising:
  determining a direction of the first wireless device, wherein the reference signal pattern is based at least in part on the direction.

14. The method of claim 9, further comprising:
  determining that the first wireless device is unable to receive assistance information from the one or more other wireless devices, wherein determining the speed, identifying the subcarrier spacing, determining the reference signal pattern, or any combination thereof, is based on the first wireless device being unable to receive assistance information from the one or more other wireless devices.

15. The method of claim 14, further comprising:
  estimating an additional speed, a direction, or both, of the one or more other wireless devices based at least in part on the first wireless device being unable to receive assistance information from the one or more other wireless devices, wherein the reference signal pattern is based at least in part on the additional speed, the direction, or both.

16. The method of claim 9, wherein the reference signal pattern comprises a demodulation reference signal pattern, and wherein the reference signal comprises a demodulation reference signal.

17. A non-transitory computer-readable medium storing code for wireless communication at a first wireless device, the code comprising instructions executable by one or more processors to cause the first wireless device to:
  determine a speed of the first wireless device;
  identify a subcarrier spacing for communications with one or more other wireless devices;
  determine, based at least in part on the speed of the first wireless device and the subcarrier spacing, a reference signal pattern of a reference signal for demodulation of data;
  transmit an indication of the reference signal pattern to the one or more other wireless devices; and
  transmit the data and the reference signal to the one or more other wireless devices, wherein the reference signal is transmitted in accordance with the reference signal pattern.

18. The non-transitory computer-readable medium of claim 17, wherein, to transmit the data and the reference signal, the instructions are further executable by the one or more processors to cause the first wireless device to:
  broadcast the data and the reference signal to the one or more other wireless devices.

19. The non-transitory computer-readable medium of claim 17, wherein, to determine the reference signal pattern of the reference signal, the instructions are further executable by the one or more processors to cause the first wireless device to:
  select the reference signal pattern from one or more reference signal patterns, each of the one or more reference signal patterns corresponding to a respective speed, a range of speeds, or a combination thereof.

20. The non-transitory computer-readable medium of claim 17, wherein the instructions are further executable by the one or more processors to cause the first wireless device to:
  determine a direction of the first wireless device, wherein the reference signal pattern is based at least in part on the direction.

21. The non-transitory computer-readable medium of claim 17, wherein the reference signal pattern comprises a demodulation reference signal pattern, and wherein the reference signal comprises a demodulation reference signal.

22. An apparatus for wireless communication at a first wireless device, comprising:
- means for determining a speed of the first wireless device;
- means for identifying a subcarrier spacing for communications with one or more other wireless devices;
- means for determining, based at least in part on the speed of the first wireless device and the subcarrier spacing, a reference signal pattern of a reference signal for demodulation of data;
- means for transmitting an indication of the reference signal pattern to the one or more other wireless devices; and
- means for transmitting the data and the reference signal to the one or more other wireless devices, wherein the reference signal is transmitted in accordance with the reference signal pattern.

23. The apparatus of claim 22, wherein the means for transmitting the data and the reference signal comprise:
- means for broadcasting the data and the reference signal to the one or more other wireless devices.

24. The apparatus of claim 22, wherein the indication of the reference signal pattern is transmitted via a sidelink control information message.

25. The apparatus of claim 22, wherein the reference signal pattern comprises a demodulation reference signal pattern, and wherein the reference signal comprises a demodulation reference signal.

* * * * *